US012718764B2

(12) United States Patent
Cheng et al.

(10) Patent No.: US 12,718,764 B2
(45) Date of Patent: *Aug. 25, 2026

(54) PIXEL CIRCUIT, DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Tianyi Cheng, Beijing (CN); Meng Li, Beijing (CN); Zhongliu Yang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,733

(22) Filed: Jan. 17, 2025

(65) Prior Publication Data

US 2025/0166571 A1 May 22, 2025

Related U.S. Application Data

(63) Continuation of application No. 18/028,458, filed as application No. PCT/CN2022/102543 on Jun. 29, 2022, now Pat. No. 12,236,884.

(51) Int. Cl.
*G09G 3/3258* (2016.01)

(52) U.S. Cl.
CPC ... *G09G 3/3258* (2013.01); *G09G 2300/0842* (2013.01); *G09G 2310/08* (2013.01); *G09G 2320/0247* (2013.01)

(58) Field of Classification Search
CPC ......... G09G 3/3258; G09G 2300/0842; G09G 2310/08; G09G 2320/0247; G09G 3/3208; G09G 3/3225; G09G 3/3233
See application file for complete search history.

(56) References Cited

U.S. PATENT DOCUMENTS

| | | | | |
|---|---|---|---|---|
| 12,236,884 B2 * | 2/2025 | Cheng | .................. | G09G 3/3233 |
| 2021/0312866 A1 * | 10/2021 | Fan | ...................... | G09G 3/3233 |
| 2021/0407383 A1 * | 12/2021 | Lai | ...................... | G09G 3/3233 |

* cited by examiner

*Primary Examiner* — Koosha Sharifi-Tafreshi
(74) *Attorney, Agent, or Firm* — BROOKS KUSHMAN P.C.

(57) ABSTRACT

A pixel circuit, a driving method and a display device. The pixel circuit includes a light emitting element, a driving circuit, an energy storage circuit, an initialization circuit, and a compensation control circuit; the display period of the pixel circuit includes a refresh frame and a retention frame; the refresh frame and the retention frame respectively include a set phase and a light emitting phase set successively; the initialization circuit is configured to control provide the initial voltage to the first terminal and/or the second terminal of the driving circuit under the control of the initial control signal provided by the initial control terminal, in the refresh frame and the retention frame, at least in the set phase. The present disclose improves hysteresis and improves the display effect.

20 Claims, 31 Drawing Sheets

PIXEL CIRCUIT, DRIVING METHOD AND DISPLAY DEVICE

CROSS-REFERENCE TO RELATED APPLICATIONS

This application is a continuation of U.S. patent application Ser. No. 18/028,458 filed on Mar. 24, 2024, which is a U.S. National Phase of International Application No. PCT/CN2022/102543 filed on Jun. 29, 2022, which are incorporated herein by reference in their entireties.

TECHNICAL FIELD

The present disclosure relates to the field of display technology, in particular to a pixel circuit, a driving method and a display device.

BACKGROUND

In recent years, with the advancement of intelligent display technology, Organic Light Emitting Diode (OLED) has become one of the hot spots in the field of display research today. With the thinning of display panels, the narrowing of frame and with the development of low frequency technology of display screen, the optimization design of display panel is becoming more and more severe.

In the related art, the threshold voltage of the driving transistor included in the pixel circuit drifts seriously, which is not conducive to improving the hysteresis and affects the display effect.

SUMMARY

In one aspect, the present disclosure provides in some embodiments a pixel circuit, includes a light emitting element, a driving circuit, an energy storage circuit, an initialization circuit, and a compensation control circuit; wherein a display period of the pixel circuit includes a refresh frame and a retention frame; the refresh frame and the retention frame each include a set phase and a light emitting phase set successively; the energy storage circuit is electrically connected to a control terminal of the driving circuit and is used for storing electric energy; the compensation control circuit is electrically connected to a compensation control terminal, the control terminal of the driving circuit, and a second terminal of the driving circuit, respectively, is configured to control to connect the control terminal of the driving circuit and the second terminal of the driving circuit under the control of a compensation control signal provided by the compensation control terminal; the initialization circuit is respectively electrically connected to an initial control terminal and an initial voltage terminal, and the initialization circuit is respectively electrically connected to a first terminal of the driving circuit and/or the second terminal of the driving circuit, is configured to control provide an initial voltage provided by the initial voltage terminal to the first terminal and/or the second terminal of the driving circuit in the refresh frame and the retention frame, at least in the set phase under the control of an initial control signal provided by the initial control terminal, in the refresh frame and the retention frame at least in the set phase; the second terminal of the driving circuit is electrically connected to the light emitting element, and is configured to drive the light emitting element under the control of a potential of the control terminal of the driving circuit.

Optionally, a driving transistor included in the driving circuit is a p-type transistor, and the initial voltage is a positive voltage.

Optionally, the initialization circuit includes a first initialization sub-circuit; the initial control terminal includes a first initial control terminal, and the initial voltage terminal includes a first initial voltage terminal; the first initialization sub-circuit is electrically connected to the first initial control terminal, the first initial voltage terminal and the second terminal of the driving circuit respectively, and is configured to write a first initial voltage provided by the first initial voltage terminal into the second terminal of the driving circuit in the refresh frame and the retention frame, at least in the set phase under the control of a first initial control signal provided by the first initial control terminal.

Optionally, the initialization circuit includes a second initialization sub-circuit; the initial control terminal includes a second initial control terminal, and the initial voltage terminal includes a second initial voltage terminal; the second initialization sub-circuit is electrically connected to the second initial control terminal, the second initial voltage terminal and the first terminal of the driving circuit, respectively, is configured to write a second initial voltage provided by the second initial voltage terminal into the first terminal of the driving circuit in the refresh frame and the retention frame, at least in the set phase under the control of a second initial control signal provided by the second initial control terminal.

Optionally, the initialization circuit includes a first initialization sub-circuit and a second initialization sub-circuit; the initial control terminal includes a first initial control terminal and a second initial control terminal, and the initial voltage terminal includes a first initial voltage terminal and a second initial voltage terminal; the first initialization sub-circuit is electrically connected to the first initial control terminal, the first initial voltage terminal and the second terminal of the driving circuit respectively, and is configured to write a first initial voltage provided by the first initial voltage terminal into the second terminal of the driving circuit in the refresh frame and the retention frame, at least in the set phase under the control of a first initial control signal provided by the first initial control terminal; the second initialization sub-circuit is electrically connected to the second initial control terminal, the second initial voltage terminal and the first terminal of the driving circuit, respectively, is configured to write a second initial voltage provided by the second initial voltage terminal into the first terminal of the driving circuit in the refresh frame and the retention frame, at least in the set phase, under the control of a second initial control signal provided by the second initial control terminal.

Optionally, the first initialization sub-circuit comprises a first transistor; a control electrode of the first transistor is electrically connected to the first initial control terminal, a first electrode of the first transistor is electrically connected to the first initial voltage terminal, and a second electrode of the first transistor is electrically connected to the second terminal of the driving circuit.

Optionally, the second initialization sub-circuit comprises a second transistor; a control electrode of the second transistor is electrically connected to the second initial control terminal, a first electrode of the second transistor is electrically connected to the second initial voltage terminal, and a second electrode of the second transistor is electrically connected to the first terminal of the driving circuit.

Optionally, the first initialization sub-circuit comprises a first transistor, and the second initialization sub-circuit comprises a second transistor; a control electrode of the first transistor is electrically connected to the first initial control terminal, a first electrode of the first transistor is electrically connected to the first initial voltage terminal, and a second electrode of the first transistor is electrically connected to the second terminal of the driving circuit; a control electrode of the second transistor is electrically connected to the second initial control terminal, a first electrode of the second transistor is electrically connected to the second initial voltage terminal, and a second electrode of the second transistor is electrically connected to the first terminal of the driving circuit.

Optionally, the pixel circuit further includes a first light emitting control circuit, a second light emitting control circuit and a data writing-in circuit; wherein the first light emitting control circuit is electrically connected to a first light emitting control terminal, a power supply voltage terminal and the first terminal of the driving circuit respectively, and is configured to control to connect the power supply voltage terminal and the first terminal of the driving circuit under the control of a first light emitting control signal provided by the first light emitting control terminal; the second light emitting control circuit is electrically connected to a second light emitting control terminal, the second terminal of the driving circuit and the first electrode of the light emitting element respectively, and is configured to control to connect the second terminal of the driving circuit and the first electrode of the light emitting element under the control of a second light emitting control signal provided by the second light emitting control terminal; the second electrode of the light emitting element is electrically connected to the first voltage terminal; the data writing-in circuit is respectively electrically connected to a writing-in control terminal, a data line and the first terminal of the driving circuit, and is configured to control to connect the data line and the first terminal of the driving circuit under the control of a data writing-in control signal provided by the writing-in control terminal.

Optionally, the pixel circuit includes a reset circuit; wherein the reset circuit is respectively electrically connected to a reset control terminal, a reset voltage terminal and the first electrode of the light emitting element, and is configured to control to write a reset voltage provided by the reset voltage terminal into the first electrode of the light emitting element under the control of a reset control signal provided by the reset control terminal.

Optionally, the compensation control circuit includes a third transistor, the first light emitting control circuit includes a fourth transistor, the second light emitting control circuit includes a fifth transistor, and the data writing-in circuit includes a sixth transistor, the driving circuit includes a driving transistor; a control electrode of the third transistor is electrically connected to the compensation control terminal, a first electrode of the third transistor is electrically connected to the control terminal of the driving circuit, and a second electrode of the third transistor is electrically connected to the second terminal of the driving circuit; a control electrode of the fourth transistor is electrically connected to the first light emitting control terminal, a first electrode of the fourth transistor is electrically connected to the power supply voltage terminal, and a second electrode of the fourth transistor is electrically connected to the first terminal of the driving circuit; a control electrode of the fifth transistor is electrically connected to the second light emitting control terminal, a first electrode of the fifth transistor is electrically connected to the second terminal of the driving circuit, and a second electrode of the fifth transistor is electrically connected to the first electrode of the light emitting element; a control electrode of the sixth transistor is electrically connected to the writing-in control terminal, a first electrode of the sixth transistor is electrically connected to the data line, and a second electrode of the sixth transistor is electrically connected to the first terminal of the driving circuit; a control electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

Optionally, the third transistor is an oxide thin film transistor.

Optionally, the reset circuit comprises a seventh transistor; a control electrode of the seventh transistor is electrically connected to the reset control terminal, a first electrode of the seventh transistor is electrically connected to the reset voltage terminal, and a second electrode of the seventh transistor is connected to the first electrode of the light emitting element.

Optionally, the seventh transistor is an oxide thin film transistor.

In a second aspect, an embodiment of the present disclosure provides a driving method, applied to the pixel circuit according to any one of claims 1 to 14, wherein the display period of the pixel circuit includes a refresh frame and a retention frame; the refresh frame and the retention frame each includes a set phase and a light emitting phase set successively; the driving method includes: in the refresh frame and the retention frame, at least in the set phase, controlling, by the initialization circuit, to provide the initial voltage provided by the initial voltage terminal to the first terminal of the driving circuit and/or the second terminal of the driving circuit under the control of the initial control signal provide by the initial control terminal.

Optionally, the initialization circuit includes a first initialization sub-circuit; the pixel circuit further includes a first light emitting control circuit, a second light emitting control circuit, a data writing-in circuit and a reset circuit; the refresh frame includes a first initialization phase, a first reset phase, a first charging phase, a first set phase, and a first light emitting phase set successively; the driving method includes: in the first initialization phase, the first initialization sub-circuit writing the first initial voltage provided by the first initial voltage terminal into the second terminal of the driving circuit under the control of the first initial control signal; the compensation control circuit controlling to connect the control terminal of the driving circuit and the second terminal of the driving circuit under the control of the compensation control signal; in the first reset phase, the reset circuit writing the reset voltage provided by the reset voltage terminal into the first electrode of the light emitting element under the control of the reset control signal, and the second light emitting control circuit controlling to connect the second terminal of the driving circuit and the first electrode of the light emitting element under the control of the second light emitting control signal; the compensation control circuit controlling to connect the control terminal of the driving circuit and the second terminal of the driving circuit under the control of the compensation control signal; in the first charging phase, the data writing-in circuit writing the data voltage provided by the data line into the first terminal of the driving circuit, and the compensation control circuit controlling to connect the control terminal and the second terminal of the driving circuit under the control of the compensation control signal; in the first set phase, the first initialization sub-circuit writing the first initial voltage provided by the first initial voltage terminal into the second terminal of the driving circuit under the control of the first initial control signal; the driving circuit controlling to connect the first terminal of the driving circuit and the second terminal of the driving circuit under the control of the potential of the control terminal of the driving circuit; in the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

Optionally, the initialization circuit includes a first initialization sub-circuit; the pixel circuit further includes a first light emitting control circuit, a second light emitting control circuit, a data writing-in circuit and a reset circuit; the retention frame includes a second initialization phase, a second reset phase, a second set phase and a second light emitting phase set successively; the driving method includes: in the retention frame, the compensation control circuit controlling to disconnect the control terminal of the driving circuit from the second terminal of the driving circuit under the control of the compensation control signal; in the second initialization phase, the first initialization sub-circuit writing the first initial voltage provided by the first initial voltage terminal into the second terminal of the driving circuit under the control of the first initial control signal; in the second reset phase, the reset circuit writing the reset voltage provided by the reset voltage terminal into the first electrode of the light emitting element under the control of the reset control signal, and the second light emitting control circuit controlling to connect the second terminal of the driving circuit and the first electrode of the light emitting element under the control of the second light emitting control signal; in the second set phase, the first initialization sub-circuit writing the first initial voltage provided by the first initial voltage terminal into the second terminal of the driving circuit under the control of the first initial control signal; the driving circuit controlling to connect the first terminal of the driving circuit and the second terminal of the driving circuit under the control of the potential of the control terminal of the driving circuit; in the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit; the retention frame further includes a retention set phase set between the second reset phase and the second set phase; the driving method further includes: in the retention set phase, the data writing-in circuit writing the voltage signal provided by the data line into the first terminal of the driving circuit.

Optionally, the initialization circuit includes a second initialization sub-circuit; the pixel circuit further includes a first light emitting control circuit, a second light emitting control circuit, a data writing-in circuit and a reset circuit; the refresh frame includes a first initialization phase, a first reset phase, a first charging phase, a first set phase, and a first light emitting phase set successively; the driving method includes: in the first initialization phase, the second initialization sub-circuit writing the second initial voltage provided by the second initial voltage terminal into the first terminal of the driving circuit under the control of the second initial control signal; the compensation control circuit controlling to connect the control terminal of the driving circuit and the second terminal of the driving circuit under the control of the compensation control signal; in the first reset phase, the reset circuit writing the reset voltage provided by the reset voltage terminal into the first electrode of the light emitting element under the control of the reset control signal; the second light emitting control circuit controlling to connect the second terminal of the driving circuit and the first electrode of the light emitting element under the control of the second light emitting control signal; the compensation control circuit controlling to connect the control terminal of the driving circuit and the second terminal of the driving circuit under the control of the compensation control signal; in the first charging phase, the data writing-in circuit writing the data voltage provided by the data line into the first terminal of the driving circuit, and the compensation control circuit controlling to connect the control terminal of the driving circuit and the second terminal of the driving circuit under the control of the compensation control signal; in the first set phase, the second initialization sub-circuit writing the second initial voltage provided by the second initial voltage terminal into the first terminal of the driving circuit under the control of the second initial control signal; the driving circuit controlling to connect the first terminal of the driving circuit and the second terminal of the driving circuit under the control of the potential of the control terminal of the driving circuit; in the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

Optionally, the initialization circuit includes a second initialization sub-circuit; the pixel circuit further includes a first light emitting control circuit, a second light emitting control circuit, a data writing-in circuit and a reset circuit; the retention frame includes a second initialization phase, a second reset phase, a second set phase and a second light emitting phase set successively; the driving method includes: in the retention frame, the compensation control circuit controlling to disconnect the control terminal of the driving circuit from the second terminal of the driving circuit under the control of the compensation control signal; in the second initialization phase, the second initialization sub-circuit writing a second initial voltage provided by the second initial voltage terminal into the first terminal of the driving circuit under the control of the second initial control signal; in the second reset phase, the reset circuit writing the reset voltage provided by the reset voltage terminal into the first electrode of the light emitting element under the control of the reset control signal; the second light emitting control circuit controlling to connect the second terminal of the driving circuit and the first electrode of the light emitting element under the control of the second light emitting control signal; in the second set phase, the second initialization sub-circuit writing the second initial voltage provided by the second initial voltage terminal into the first terminal of the driving circuit under the control of the second initial control signal; the driving circuit controlling to connect the first terminal of the driving circuit and the second terminal of the driving circuit under the control of the potential of the control terminal of the driving circuit; in the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit; the retention frame further includes a retention set phase set between the second reset phase and the second set phase; the driving method further includes: in the retention set phase, the data writing-in circuit writing the voltage signal provided by the data line into the first terminal of the driving circuit.

Optionally, the initialization circuit includes a first initialization sub-circuit and a second initialization sub-circuit; the pixel circuit further includes a first light emitting control circuit, a second light emitting control circuit and a data writing-in circuit; the refresh frame includes a first reset phase, a first charging phase, a first set phase, and a first light emitting phase that are set successively; the driving method includes: in the first reset phase, the first initialization sub-circuit writing the first initial voltage provided by the first initial voltage terminal into the second terminal of the driving circuit under the control of the first initial control signal, and the compensation control circuit controlling to connect the control terminal of the driving circuit and the second terminal of the driving circuit under the control of the compensation control signal; in the first charging phase, the data writing-in circuit writing the data voltage provided by the data line into the first terminal of the driving circuit, and the compensation control circuit controlling to connect the control terminal of the driving circuit and the second terminal of the driving circuit under the control of the compensation control signal; in the first set phase, the second initialization sub-circuit writing the second initial voltage provided by the second initial voltage terminal into the first terminal of the driving circuit under the control of the second initial control signal, the driving circuit controlling to connect the first terminal of the driving circuit and the second terminal of the driving circuit under the control of the potential of the control terminal of the driving circuit; in the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

Optionally, the pixel circuit further comprises a reset circuit; the driving method further comprises: in the first set phase, the reset circuit writing the reset voltage provided by the reset voltage terminal into the first electrode of the light emitting element under the control of the reset control signal.

Optionally, the initialization circuit includes a first initialization sub-circuit and a second initialization sub-circuit; the pixel circuit also includes a first light emitting control circuit, a second light emitting control circuit and a data writing-in circuit; the retention frame includes a second reset phase, a second set phase, and a second light emitting phase set successively; the driving method includes: in the retention frame, the compensation control circuit controlling to disconnect the control terminal of the driving circuit from the second terminal of the driving circuit under the control of the compensation control signal; in the second reset phase, the first initialization sub-circuit writing the first initial voltage provided by the first initial voltage terminal into the second terminal of the driving circuit under the control of the first initial control signal; in the second set phase, the second initialization sub-circuit writing the second initial voltage provided by the second initial voltage terminal into the first terminal of the driving circuit under the control of the second initial control signal, the driving circuit controlling to connect the first terminal of the driving circuit and the second terminal of the driving circuit under the control of the potential of the control terminal of the driving circuit; in the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

Optionally, the pixel circuit further comprises a reset circuit; the driving method further comprises: in the second set phase, the reset circuit writing the reset voltage provided by the reset voltage terminal into the first electrode of the light emitting element under the control of the reset control signal.

Optionally, the retention frame further includes a retention set phase set between the second reset phase and the second set phase; the driving method further includes: in the retention set phase, the data writing-in circuit writing the voltage signal provided by the data line into the first terminal of the driving circuit.

In a third aspect, an embodiment of the present disclosure provides a display device comprising the pixel circuit.

DETAILED DESCRIPTION

Figure 1:
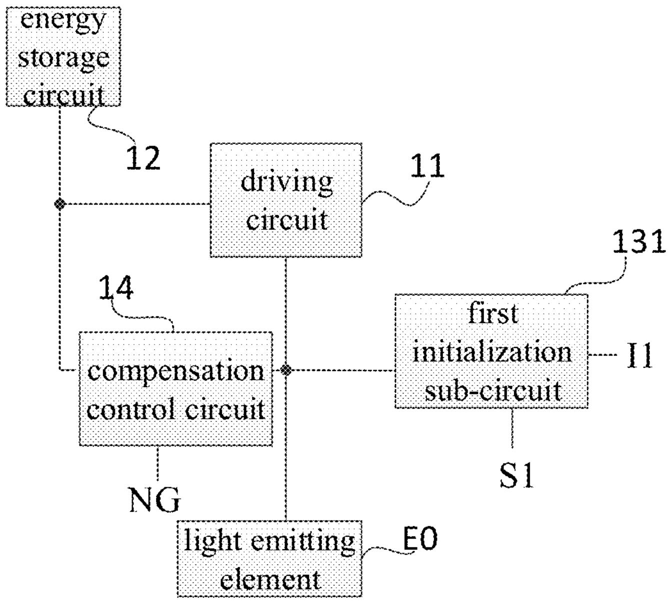
FIG. 1 is a structural diagram of a pixel circuit described in at least one embodiment of the present disclosure.

The following will clearly and completely describe the technical solutions in the embodiments of the present disclosure with reference to the accompanying drawings. Apparently, the described embodiments are only some of the embodiments of the present disclosure, not all of them. Based on the embodiments in the present disclosure, all other embodiments obtained by persons of ordinary skill in the art without creative efforts belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The pixel circuit described in the embodiment of the present disclosure includes a light emitting element, a driving circuit, an energy storage circuit, an initialization circuit, and a compensation control circuit; the display period of the pixel circuit includes a refresh frame and a retention frame; the refresh frame and the retention frame each includes a reset phase and a light emitting phase set successively;

The energy storage circuit is electrically connected to the control terminal of the driving circuit for storing electric energy;

The compensation control circuit is electrically connected to the compensation control terminal, the control terminal of the driving circuit, and the second terminal of the driving circuit, and is used to control to connect the control terminal of the driving circuit and the second terminal of the driving circuit under the control of a compensation control signal provided by the compensation control terminal;

The initialization circuit is respectively electrically connected to the initial control terminal and the initial voltage terminal, and the initialization circuit is respectively electrically connected to the first terminal of the driving circuit and/or the second terminal of the driving circuit, is configured to control provide the initial voltage provided by the initial voltage terminal to the first terminal and/or the second terminal of the driving circuit under the control of the initial control signal provided by the initial control terminal, in the refresh frame and the retention frame, at least in the set phase;

The second terminal of the driving circuit is electrically connected to the light emitting element, and is used to drive the light emitting element under the control of the potential of the control terminal of the driving circuit.

When the pixel circuit described in the embodiments of the present disclosure is working, the initialization circuit, under the control of the initial control signal, in the refresh frame and the retention frame, at least in the set phase, controls to provide the initial voltage signal provided by the initial voltage terminal to the first terminal of the driving circuit and/or the second terminal of the driving circuit to provide a bias voltage to the driving transistor included in the driving circuit, so that the driving transistor included in the driving circuit is in a bias state to improve the hysteresis and enhance the display effect.

The pixel circuit described in the embodiments of the present disclosure can improve flicker phenomenon during low-frequency display.

Since the display period includes a refresh frame and a retention frame during low-frequency display, during the reset phase in the retention frame, the driving transistor included in the driving circuit is biased, so that during the reset phase in the retention frame, the potential of the source electrode of the driving transistor and the potential of the drain electrode of the driving transistor in the driving circuit are consistent with the refresh frame, and the flickering phenomenon can be improved.

In at least one embodiment of the present disclosure, the driving transistor included in the driving circuit is a p-type transistor, and the initial voltage is a positive voltage.

Optionally, the energy storage circuit may include a storage capacitor;

The first terminal of the storage capacitor is electrically connected to the control terminal of the driving circuit, and the second terminal of the storage capacitor is electrically connected to the power supply voltage terminal.

In at least one embodiment of the present disclosure, the initialization circuit may include a first initialization sub-circuit; the initial control terminal includes a first initial control terminal, and the initial voltage terminal includes a first initial voltage terminal;

The first initialization sub-circuit is electrically connected to the first initial control terminal, the first initial voltage terminal and the second terminal of the driving circuit respectively, and is configured to write the first initial voltage provided by the first initial voltage terminal into the second terminal of the driving circuit in the refresh frame and the retention frame at least in the set phase under the control of the first initial voltage provided by the first initial control terminal.

As shown in FIG. 1, the pixel circuit described in at least one embodiment of the present disclosure may include a light emitting element E0, a driving circuit 11, an energy storage circuit 12, an initialization circuit, and a compensation control circuit 14; the display period of the pixel circuit includes a refresh frame and a retention frame; the refresh frame and the retention frame respectively include a reset phase and a light emitting phase set successively;

The energy storage circuit 12 is electrically connected to the control terminal of the driving circuit for storing electric energy;

The compensation control circuit 14 is electrically connected to the compensation control terminal NG, the control terminal of the driving circuit 11, and the second terminal of the driving circuit 11, respectively, is configured to control to connect the control terminal of the driving circuit 11 and the second terminal of the driving circuit 11 under the control of the compensation control signal provided by the compensation control terminal NG;

The initialization circuit includes a first initialization sub-circuit 131; the initial control terminal includes a first initial control terminal S1, and the initial voltage terminal includes a first initial voltage terminal I1;

The first initialization sub-circuit 131 is electrically connected to the first initial control terminal S1, the first initial voltage terminal I1, and the second terminal of the driving circuit 11, is configured to write the first initial voltage provided by the first initial voltage terminal I1 into the second terminal of the driving circuit 11 under the control of the first initial control signal provided by the first initial control terminal S1, in the refresh frame and the retention frame, at least in the set phase, to control the driving transistor included in the driving circuit 11 to be in a bias state;

The second terminal of the driving circuit 11 is electrically connected to the light emitting element E0, is configured to drive the light emitting element E0 under the control of the potential of the control terminal of the driving circuit 11.

In at least one embodiment of the present disclosure, the initialization circuit includes a second initialization sub-circuit; the initial control terminal includes a second initial control terminal, and the initial voltage terminal includes a second initial voltage terminal;

The second initialization sub-circuit is electrically connected to the second initial control terminal, the second initial voltage terminal and the first terminal of the driving circuit, respectively, is configured to write the second initial voltage provided by the second initial voltage terminal into the first terminal of the driving circuit under the control of the second initial control signal provided by the second initial control terminal, in the refresh frame and the retention frame, at least in the set phase.

Figure 2:
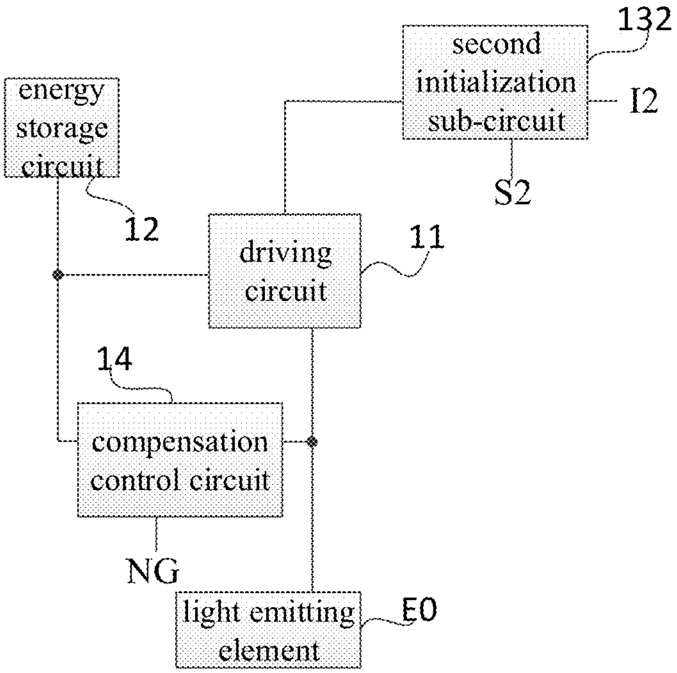
FIG. 2 is a structural diagram of a pixel circuit described in at least one embodiment of the present disclosure.

As shown in FIG. 2, the pixel circuit described in at least one embodiment of the present disclosure may include a light emitting element E0, a driving circuit 11, an energy storage circuit 12, an initialization circuit, and a compensation control circuit 14; the display period of the pixel circuit includes a refresh frame and a retention frame; the refresh frame and the retention frame respectively include a reset phase and a light emitting phase set successively;

The energy storage circuit 12 is electrically connected to the control terminal of the driving circuit for storing electric energy;

The compensation control circuit 14 is electrically connected to the compensation control terminal NG, the control terminal of the driving circuit 11, and the second terminal of the driving circuit 11, respectively, is configured to control to connect the control terminal of the driving circuit 11 and the second terminal of the driving circuit 11 under the control of the compensation control signal provided by the compensation control terminal NG.

The initialization circuit includes a second initialization sub-circuit 132; the initial control terminal includes a second initial control terminal S2, and the initial voltage terminal includes a second initial voltage terminal I2;

The second initialization sub-circuit 132 is electrically connected to the second initial control terminal S2, the second initial voltage terminal I2, and the first terminal of the driving circuit 11, respectively, is configured to write the second initial voltage provided by the second initial voltage terminal I2 into the first terminal of the driving circuit 11 under the control of the second initial control signal provided by the second initial control terminal S2, in the refresh frame and the retention frame, at least in the set phase, to control the driving transistor included in the driving circuit 11 to be in a bias state;

The second terminal of the driving circuit 11 is electrically connected to the light emitting element E0, is configured to drive the light emitting element E0 under the control of the potential of the control terminal of the driving circuit 11.

In at least one embodiment of the present disclosure, the initialization circuit includes a first initialization sub-circuit and a second initialization sub-circuit; the initial control terminal includes a first initial control terminal and a second initial control terminal, and the initial voltage terminal includes a first initial voltage terminal and a second initial voltage terminal;

The first initialization sub-circuit is electrically connected to the first initial control terminal, the first initial voltage terminal and the second terminal of the driving circuit respectively, and is configured to write the first initial voltage provided by the first initial voltage terminal into the second terminal of the driving circuit in the refresh frame and the retention frame, at least in the set phase under the control of the first initial control signal provided by the first initial control terminal;

The second initialization sub-circuit is electrically connected to the second initial control terminal, the second initial voltage terminal and the first terminal of the driving circuit, respectively, is configured to write the second initial voltage provided by the second initial voltage terminal into the first terminal of the driving circuit in the refresh frame and the retention frame, at least in the set phase, under the control of the second initial control signal provided by the second initial control terminal.

Figure 3:
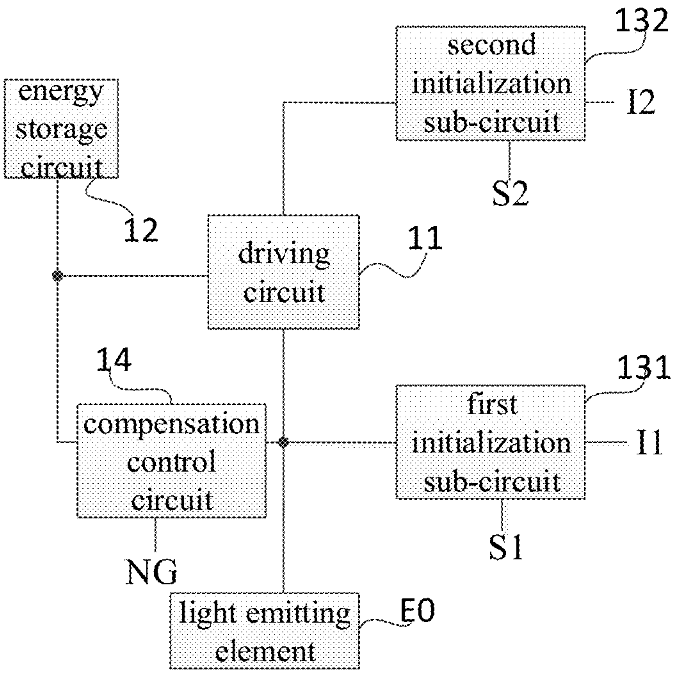
FIG. 3 is a structural diagram of a pixel circuit described in at least one embodiment of the present disclosure.

As shown in FIG. 3, the pixel circuit described in at least one embodiment of the present disclosure may include a light emitting element E0, a driving circuit 11, an energy storage circuit 12, an initialization circuit, and a compensation control circuit 14; the display period of the pixel circuit includes a refresh frame and a retention frame; the refresh frame and the retention frame respectively include a reset phase and a light emitting phase set successively;

The energy storage circuit 12 is electrically connected to the control terminal of the driving circuit for storing electric energy;

The compensation control circuit 14 is electrically connected to the compensation control terminal NG, the control terminal of the driving circuit 11, and the second terminal of the driving circuit 11, respectively, is configured to control to connect the control terminal of the driving circuit 11 and the second terminal of the driving circuit 11 under the control of the compensation control signal provided by the compensation control terminal NG;

The initialization circuit includes a first initialization sub-circuit 131 and a second initialization sub-circuit 132; the initial control terminal includes a first initial control terminal S1 and a second initial control terminal S2, and the initial voltage terminal includes a first initial voltage terminal I1 and the second initial voltage terminal I2;

The first initialization sub-circuit 131 is electrically connected to the first initial control terminal S1, the first initial voltage terminal I1 and the second terminal of the driving circuit, respectively, is configured to write the first initial voltage provided by the first initial voltage terminal I1 into the second terminal of the driving circuit 11 in the refresh frame and the retention frame, at least in the set phase, under the control of the first initial control signal provided by the first initial control terminal S1;

The second initialization sub-circuit is electrically connected to the second initial control terminal S2, the second initial voltage terminal I2, and the first terminal of the driving circuit 11, respectively, is configured to write the second initial voltage provided by the second initial voltage terminal I2 into the first terminal of the driving circuit 11 in the refresh frame and the retention frame, at least in the set phase under the control of the second initial control signal provided by the second initial control terminal S2, The second terminal of the driving circuit 11 is electrically connected to the light emitting element E0, is configured to drive the light emitting element E0 under the control of the potential of the control terminal of the driving circuit 11.

Optionally, the first initialization sub-circuit includes a first transistor;

A control electrode of the first transistor is electrically connected to the first initial control terminal, a first electrode of the first transistor is electrically connected to the first initial voltage terminal, and a second electrode of the first transistor is electrically connected to the second terminal of the driving circuit.

Optionally, the second initialization sub-circuit includes a second transistor;

A control electrode of the second transistor is electrically connected to the second initial control terminal, a first electrode of the second transistor is electrically connected to the second initial voltage terminal, and a second electrode of the second transistor is electrically connected to the first terminal of the driving circuit.

Optionally, the first initialization sub-circuit includes a first transistor, and the second initialization sub-circuit includes a second transistor;

A control electrode of the first transistor is electrically connected to the first initial control terminal, a first electrode of the first transistor is electrically connected to the first initial voltage terminal, and a second electrode of the first transistor is electrically connected to the second terminal of the driving circuit;

A control electrode of the second transistor is electrically connected to the second initial control terminal, a first electrode of the second transistor is electrically connected to the second initial voltage terminal, and a second electrode of the second transistor is electrically connected to the first terminal of the driving circuit.

The pixel circuit described in at least one embodiment of the present disclosure further includes a first light emitting control circuit, a second light emitting control circuit and a data writing-in circuit;

The first light emitting control circuit is electrically connected to the first light emitting control terminal, the power supply voltage terminal and the first terminal of the driving circuit respectively, and is used to control to connect the power supply voltage terminal and the first terminal of the driving circuit under the control of the first light emitting control signal provided by the first light emitting control terminal;

The second light emitting control circuit is electrically connected to the second light emitting control terminal, the second terminal of the driving circuit and the first electrode of the light emitting element respectively, and is configured to control to connect the second terminal of the driving circuit and the first electrode of the light emitting element under the control of the second light emitting control signal provided by the second light emitting control terminal; to connect the second electrode of the light emitting element and the first voltage terminal;

The data writing-in circuit is respectively electrically connected to the writing-in control terminal, the data line and the first terminal of the driving circuit, and is used to control to connect the data line and the first terminal of the driving circuit under the control of the data writing-in control signal provided by the writing-in control terminal.

During specific implementation, the first light emitting control circuit and the second light emitting control circuit are used for controlling light emitting, and the data writing-in circuit is used for writing the data voltage.

In at least one embodiment of the present disclosure, the pixel circuit further includes a reset circuit;

The reset circuit is respectively electrically connected to the reset control terminal, the reset voltage terminal and the first electrode of the light emitting element, and is used to control to write the reset voltage provided by the reset voltage terminal into the first electrode of the light emitting element under the control of the reset control signal provided by the reset control terminal.

During specific implementation, the reset circuit writes a reset voltage into the first electrode of the light emitting element under the control of the reset control signal, so as to control the light emitting element not to emit light, and remove residual charge on the first electrode of the light emitting element.

Figure 4:
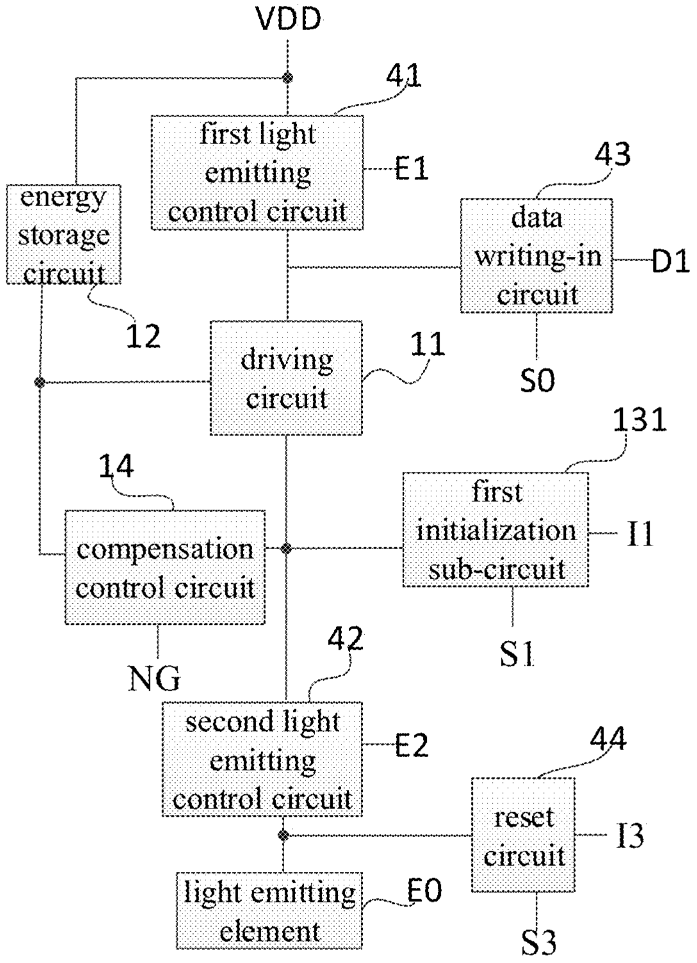
FIG. 4 is a structural diagram of a pixel circuit according to at least one embodiment of the present disclosure.

As shown in FIG. 4, on the basis of at least one embodiment of the pixel circuit shown in FIG. 1, the pixel circuit further includes a first light emitting control circuit 41, a second light emitting control circuit 42, a data writing-in circuit 43 and a reset circuit 44;

The first light emitting control circuit 41 is electrically connected to the first light emitting control terminal E1, the power supply voltage terminal VDD and the first terminal of the driving circuit 11 respectively, and is used to control to connect the power supply voltage terminal VDD and the first terminal of the driving circuit 11 under the control of the first light emitting control signal provided by the first light emitting control terminal E1;

The second light emitting control circuit 42 is electrically connected to the second light emitting control terminal E2, the second terminal of the driving circuit 11, and the first electrode of the light emitting element E0, respectively, and is used to, under the control of the second light emitting control signal provided by the second light emitting control terminal E2, control to connect the second terminal of the driving circuit 11 and the first electrode of the light emitting element E0; and connect the second electrode of the light emitting element E0 and the first voltage terminal V1;

The data writing-in circuit 43 is electrically connected to the writing-in control terminal S0, the data line D1 and the first terminal of the driving circuit 11 respectively, and is used to control to connect the data line D1 and the first terminal of the driving circuit 11 under the control of the writing-in control signal provided by the writing-in control terminal S0;

The reset circuit 44 is electrically connected to the reset control terminal S3, the reset voltage terminal I3 and the first electrode of the light emitting element E0 respectively, and is used to control to write control the reset voltage provided by the reset voltage terminal I3 into the first electrode of the light emitting element E0 under the control of the reset control signal provided by the reset control terminal S3.

When at least one embodiment of the pixel circuit shown in FIG. 4 is working, the refresh frame includes a first initialization phase, a first reset phase, a first charging phase, a first reset phase and a first light emitting phase set successively;

In the first initialization phase, the first initialization sub-circuit 131 writes the first initial voltage Vi1 provided by the first initial voltage terminal I1 into the second terminal of the driving circuit 11 under the control of the first initial control signal; the compensation control circuit 14 controls to connect the control terminal of the driving circuit 11 and the second terminal of the driving circuit 11 under the control of the compensation control signal;

In the first reset phase, under the control of the reset control signal, the reset circuit 44 writes the reset voltage Vi3 provided by the reset voltage terminal I3 into the first electrode of the light emitting element E0, and the second light emitting control circuit 42 controls to connect the second terminal of the driving circuit 11 and the first electrode of the light emitting element E0 under the control of the second light emitting control signal; the compensation control circuit 14 controls to connect the control terminal of the driving circuit 11 and the second terminal of the driving circuit 11 under the control of the compensation control signal;

In the first charging phase, the data writing-in circuit 43 writes the data voltage provided by the data line D1 into the first terminal of the driving circuit 11, and the compensation control circuit 14 controls to connect the control terminal of the driving circuit 11 and the second terminal of the driving circuit 11 under the control of the compensation control signal;

In the first reset phase, the first initialization sub-circuit 131 writes the first initial voltage Vi1 provided by the first initial voltage terminal I1 into the second terminal of the driving circuit 11 under the control of the first initial control signal; the driving circuit 11 controls to connect the first terminal of the driving circuit 11 and the second terminal of the driving circuit 11 under the control of the potential of the control terminal of the driving circuit, so as to control the driving transistor included in the driving circuit 11 in a biased state;

In the first light emitting phase, the first light emitting control circuit 41 controls to connect the power supply voltage terminal VDD and the first terminal of the driving circuit 11 under the control of the first light emitting control signal; the second light emitting control circuit 42 controls to connect the second terminal of the driving circuit 11 and the first electrode of the light emitting element E0 under the control of the second light emitting control signal; the driving circuit 11 drives the light emitting element E0 emits light under the control of the potential of the control terminal of the driving circuit.

When at least one embodiment of the pixel circuit shown in FIG. 4 of the present disclosure is in operation, the retention frame includes a second initialization phase, a second reset phase, a second reset phase, and a second light emitting phase that are set successively;

In the retention frame, the compensation control circuit 14 controls to disconnect the control terminal of the driving circuit 11 from the second terminal of the driving circuit 11 under the control of the compensation control signal;

In the second initialization phase, the first initialization sub-circuit 131 writes the first initial voltage Vi1 provided by the first initial voltage terminal I1 into the second terminal of the driving circuit 11 under the control of the first initial control signal;

In the second reset phase, under the control of the reset control signal, the reset circuit 44 writes the reset voltage Vi3 provided by the reset voltage terminal I3 into the first electrode of the light emitting element E0, and the second light emitting control circuit 42 controls to connect the second terminal of the driving circuit 11 and the first electrode of the light emitting element E0 under the control of the light emitting control signal;

In the second reset phase, the first initialization sub-circuit 131 writes the first initial voltage Vi1 provided by the first initial voltage terminal I1 into the second terminal of the driving circuit 11 under the control of the first initial control signal; the driving circuit 11 controls to connect the first terminal of the driving circuit 11 and the second terminal of the driving circuit 11 under the control of the potential of the control terminal of the driving circuit, so as to control the driving transistor included in the driving circuit 11 in a biased state;

In the second light emitting phase, the first light emitting control circuit 41 controls to connect the power supply voltage terminal VDD and the first terminal of the driving circuit 11 under the control of the first light emitting control signal; the second light emitting control circuit 42 control to connect the second terminal of the driving circuit 11 and the first electrode of the light emitting element E0 under the control of the second light emitting control signal; the driving circuit 11 drives the light emitting element E0 to emit light under the control of potential of the control terminal of the driving circuit 11.

When at least one embodiment of the pixel circuit shown in FIG. 4 of the present disclosure is in operation, the retention frame may further include a retention set phase set between the second reset phase and the second reset phase;

In the retention set phase, the data writing-in circuit 43 writes the voltage signal provided by the data line D1 into the first terminal of the driving circuit 11.

Figure 5:
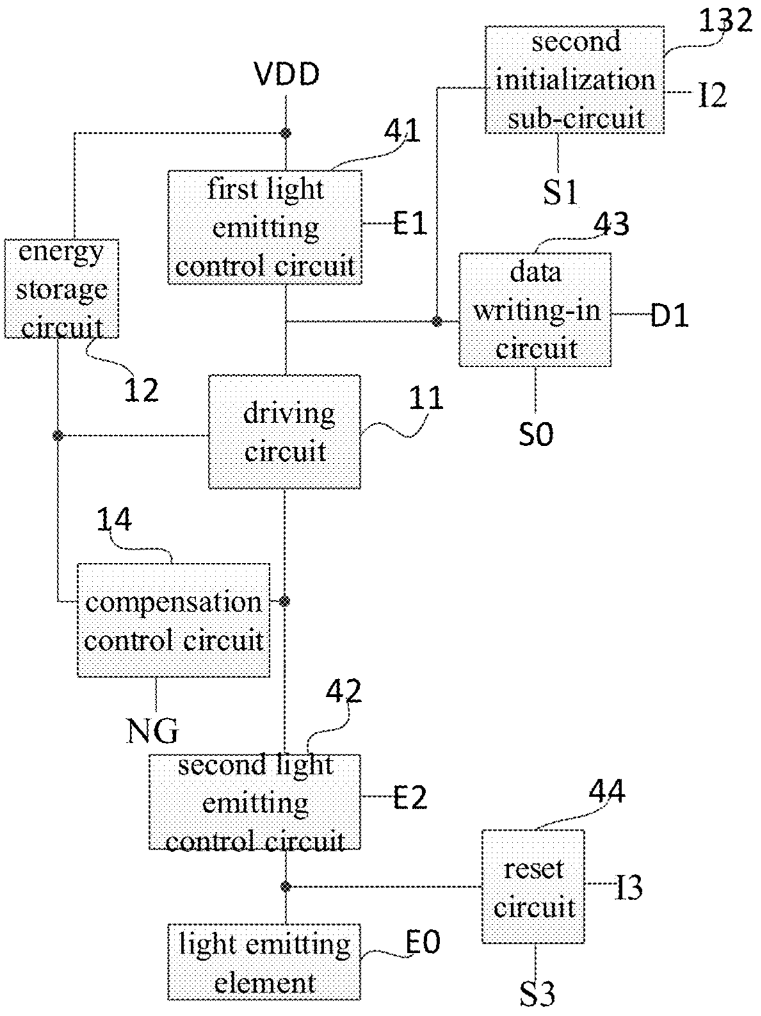
FIG. 5 is a structural diagram of a pixel circuit according to at least one embodiment of the present disclosure.

As shown in FIG. 5, on the basis of at least one embodiment of the pixel circuit shown in FIG. 2, the pixel circuit further includes a first light emitting control circuit 41, a second light emitting control circuit 42, a data writing-in circuit 43 and a reset circuit 44;

The first light emitting control circuit 41 is electrically connected to the first light emitting control terminal E1, the power supply voltage terminal VDD and the first terminal of the driving circuit 11 respectively, and is used to control to connect the power supply voltage terminal VDD and the first terminal of the driving circuit 11 under the control of the first light emitting control signal provided by the first light emitting control terminal E1;

The second light emitting control circuit 42 is electrically connected to the second light emitting control terminal E2, the second terminal of the driving circuit 11, and the first electrode of the light emitting element E0, respectively, and is used to control to connect the second terminal of the driving circuit 11 and the first electrode of the light emitting element E0, control to connect the second electrode of the light emitting element E0 and the first voltage terminal V1 under the control of the second light emitting control signal provided by the second light emitting control terminal E2;

The data writing-in circuit 43 is electrically connected to the writing-in control terminal S0, the data line D1 and the first terminal of the driving circuit 11 respectively, and is used to control to connect the data line D1 and the first terminal of the driving circuit 11 under the control of the writing-in control signal provided by the writing-in control terminal S0;

The reset circuit 44 is electrically connected to the reset control terminal S3, the reset voltage terminal I3 and the first electrode of the light emitting element E0 respectively, and is used to control to write the reset voltage provided by the reset voltage terminal I3 into the first electrode of the light emitting element E0 under the control of the reset control signal provided by the reset control terminal S3.

When at least one embodiment of the pixel circuit shown in FIG. 5 of the present disclosure is working, the refresh frame includes the first initialization phase, the first reset phase, the first charging phase, the first reset phase and the first light emitting phase set successively;

In the first initialization phase, the second initialization sub-circuit 132 writes the second initial voltage Vi2 provided by the second initial voltage terminal I2 into the first terminal of the driving circuit 11 under the control of the second initial control signal; the compensation control circuit 14 controls to connect the control terminal of the driving circuit 11 and the second terminal of the driving circuit 11 under the control of the compensation control signal;

In the first reset phase, the reset circuit 44 writes the reset voltage Vi3 provided by the reset voltage terminal I3 into the first electrode of the light emitting element E0 under the control of the reset control signal; the second light emitting control circuit 42 controls to connect the second terminal of the driving circuit 11 and the first electrode of the light emitting element E0 under the control of the second light emitting control signal; the compensation control circuit 14 controls to connect the control terminal of the driving circuit 11 and the second terminal of the driving circuit 11 under the control of the compensation control signal;

In the first charging phase, the data writing-in circuit 43 writes the data voltage Vdata provided by the data line D1 into the first terminal of the driving circuit 11, and the compensation control circuit 14 controls to connect the control terminal of the driving circuit 11 and the second terminal of the driving circuit 11 under the control of the compensation control signal;

In the first reset phase, the second initialization sub-circuit 132 writes the second initial voltage Vi2 provided by the second initial voltage terminal i2 into the first terminal of the driving circuit 11 under the control of the second initial control signal; the driving circuit 11 controls to connect the first terminal of the driving circuit 11 and the second terminal of the driving circuit 11 under the control of the potential of the control terminal of the driving circuit 11, so as to control the driving transistor included in the driving circuit 11 in a biased state;

In the first light emitting phase, the first light emitting control circuit 41 controls to connect the power supply voltage terminal VDD and the first terminal of the driving circuit 11 under the control of the first light emitting control signal; the second light emitting control circuit 42 controls to connect the second terminal of the driving circuit 11 and the first electrode of the light emitting element E0 under the control of the second light emitting control signal; the driving circuit 11 drives the light emitting element E0 to emit light under the control of the control terminal of the driving circuit 11.

When at least one embodiment of the pixel circuit shown in FIG. 5 of the present disclosure is working, the retention frame includes a second initialization phase, a second reset phase, a second set phase, and a second light emitting phase that are set successively;

In the retention frame, the compensation control circuit 14 controls to disconnect the control terminal of the driving circuit 11 from the second terminal of the driving circuit 11 under the control of the compensation control signal;

In the second initialization phase, the second initialization sub-circuit 132 writes the second initial voltage Vi2 provided by the second initial voltage terminal I2 into the first terminal of the driving circuit 11 under the control of the second initial control signal;

In the second reset phase, the reset circuit 44 writes the reset voltage Vi3 provided by the reset voltage terminal I3 into the first electrode of the light emitting element E0 under the control of the reset control signal; controls to connect the second terminal of the driving circuit 11 and the first electrode of the light emitting element E0 under the control of the second light emitting control signal;

In the second set phase, the second initialization sub-circuit 132 writes the second initial voltage Vi2 provided by the second initial voltage terminal I2 into the first terminal of the driving circuit 11 under the control of the second initial control signal; the driving circuit 11 controls to connect the first terminal of the driving circuit 11 and the second terminal of the driving circuit 11 under the control of the potential of the control terminal of the driving circuit 11, so as to control the driving transistor included in the driving circuit 11 in a biased state;

In the second light emitting phase, the first light emitting control circuit 41 controls to connect the power supply voltage terminal VDD and the first terminal of the driving circuit 11 under the control of the first light emitting control signal; the second light emitting control circuit 42 controls to connect the second terminal of the driving circuit 11 and the first electrode of the light emitting element E0 under the control of the second light emitting control signal; the driving circuit 11 drives the light emitting element E0 to emit light under the control of the control terminal of the driving circuit 11.

When at least one embodiment of the pixel circuit shown in FIG. 5 of the present disclosure is in operation, the retention frame further includes a retention set phase set between the second reset phase and the second set phase;

In the retention set phase, the data writing-in circuit 43 writes the voltage signal provided by the data line D1 into the first terminal of the driving circuit 11.

Figure 6:
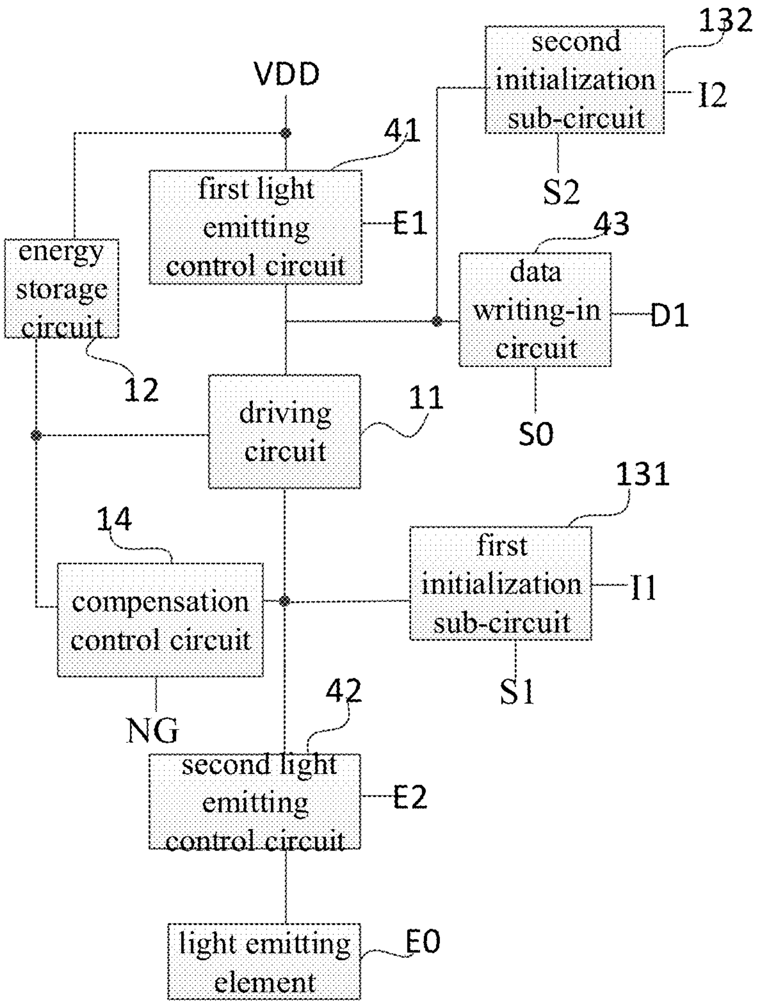
FIG. 6 is a structural diagram of a pixel circuit according to at least one embodiment of the present disclosure.

As shown in FIG. 6, on the basis of at least one embodiment of the pixel circuit shown in FIG. 3, the pixel circuit further includes a first light emitting control circuit 41, a second light emitting control circuit 42 and a data writing-in circuit 43;

The first light emitting control circuit 41 is electrically connected to the first light emitting control terminal E1, the power supply voltage terminal VDD and the first terminal of the driving circuit 11 respectively, and is configured to control to connect the power supply voltage terminal VDD and the first terminal of the driving circuit 11 under the control of the first light emitting control signal provided by the first light emitting control terminal E1;

The second light emitting control circuit 42 is electrically connected to the second light emitting control terminal E2, the second terminal of the driving circuit 11, and the first electrode of the light emitting element E0, respectively, and is used to control to connect the second terminal of the driving circuit 11 and the first electrode of the light emitting element E0; connect the second electrode of the light emitting element E0 and the first voltage terminal V1 under the control of the second light emitting control signal provided by the second light emitting control terminal E2;

The data writing-in circuit 43 is electrically connected to the writing-in control terminal S0, the data line D1 and the first terminal of the driving circuit 11 respectively, and is used to control the data line D1 and the first terminal of the driving circuit 11 under the control of the writing-in control signal provided by the writing-in control terminal S0.

When at least one embodiment of the pixel circuit shown in FIG. 6 of the present disclosure is in operation, the refresh frame includes a first reset phase, a first charging phase, a first set phase, and a first light emitting phase;

In the first reset phase, under the control of the first initial control signal, the first initialization sub-circuit 131 writes the first initial voltage Vi1 provided by the first initial voltage terminal I1 into the second terminal of the driving circuit 11, the compensation control circuit 14 controls to connect the control terminal of the driving circuit 11 and the second terminal of the driving circuit 11 under the control of the compensation control signal;

In the first charging phase, the data writing-in circuit 43 writes the data voltage Vdata provided by the data line D1 into the first terminal of the driving circuit 11, and the compensation control circuit 14 controls to connect the control terminal of the driving circuit 11 and the second terminal of the driving circuit 11 under the control of the compensation control signal;

In the first set phase, the second initialization sub-circuit 132 writes the second initial voltage Vi2 provided by the second initial voltage terminal I2 into the first terminal of the driving circuit 11 under the control of the second initial control signal, the driving circuit 11 controls to connect the first terminal of the driving circuit 11 and the second terminal of the driving circuit 11 under the control of the potential of the control terminal thereof, so as to control the driving transistor included in the driving circuit in a biased state;

In the first light emitting phase, the first light emitting control circuit 41 controls to connect the power supply voltage terminal VDD and the first terminal of the driving circuit 11 under the control of the first light emitting control signal; the second light emitting control circuit 42 controls to connect the second terminal of the driving circuit 11 and the first electrode of the light emitting element E0 under the control of the second light emitting control signal; the driving circuit 11 drives the light emitting element E0 to emit light.

When at least one embodiment of the pixel circuit shown in FIG. 6 of the present disclosure is working, the retention frame includes a second initialization phase, a second reset phase, a second set phase, and a second light emitting phase;

In the retention frame, the compensation control circuit 14 controls to disconnect the control terminal of the driving circuit 11 from the second terminal of the driving circuit 11 under the control of the compensation control signal;

In the second reset phase, the first initialization sub-circuit 131 writes the first initial voltage Vi1 provided by the first initial voltage terminal I1 into the second terminal of the driving circuit 11 under the control of the first initial control signal;

In the second set phase, the second initialization sub-circuit 132 writes the second initial voltage Vi2 provided by the second initial voltage terminal I2 into the first terminal of the driving circuit 11 under the control of the second initial control signal, the driving circuit 11 controls to connect the first terminal of the driving circuit 11 and the second terminal of the driving circuit 11 under the control of the potential of the control terminal of the driving circuit 11, so as to control the driving transistor included in the driving circuit 11 in a biased state;

In the second light emitting phase, the first light emitting control circuit 41 controls to connect the power supply voltage terminal VDD and the first terminal of the driving circuit 11 under the control of the first light emitting control signal; the second light emitting control circuit 42 controls to connect the second terminal of the driving circuit 11 and the first electrode of the light emitting element E0 under the control of the second light emitting control signal; the driving circuit 11 drives the light emitting element E0 to emit light under the control of the potential of the control terminal of the driving circuit 11.

When at least one embodiment of the pixel circuit shown in FIG. 6 of the present disclosure is in operation, the retention frame further includes a retention set phase set between the second reset phase and the second set phase;

In the retention set phase, the data writing-in circuit 43 writes the voltage signal provided by the data line D1 into the first terminal of the driving circuit 11.

Figure 7:
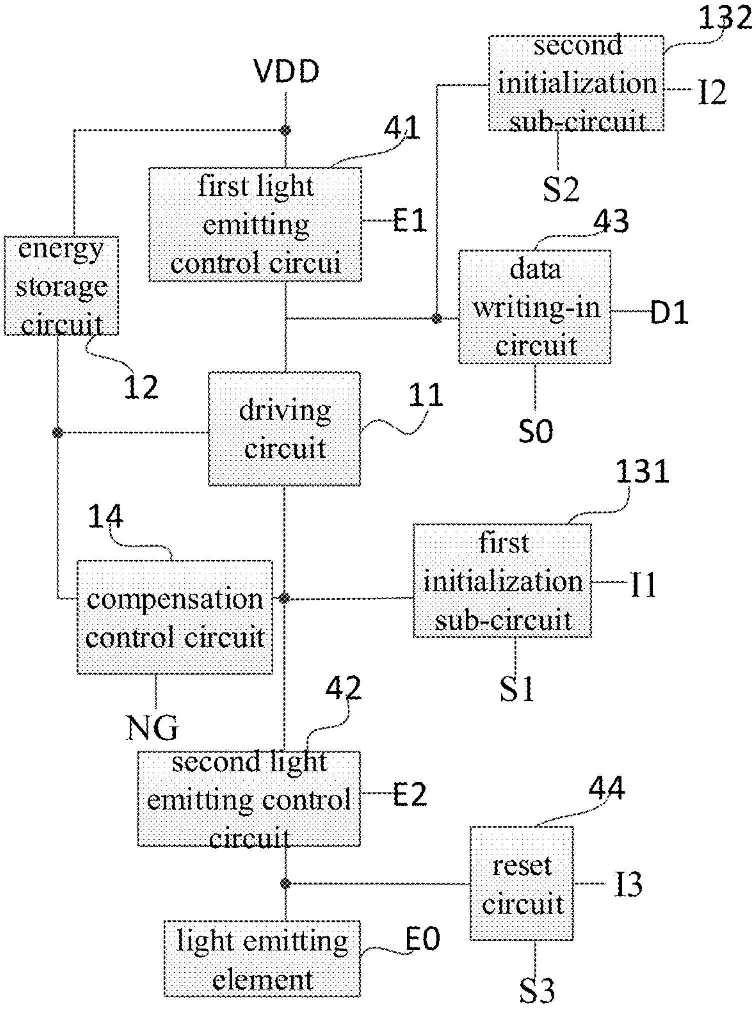
FIG. 7 is a structural diagram of a pixel circuit according to at least one embodiment of the present disclosure.

As shown in FIG. 7, on the basis of at least one embodiment of the pixel circuit shown in FIG. 6, the pixel circuit described in at least one embodiment of the present disclosure further includes a reset circuit 44;

The reset circuit 44 is electrically connected to the reset control terminal S3, the reset voltage terminal I3 and the first electrode of the light emitting element E0 respectively, and is used to control to write the reset voltage provided by the reset voltage terminal I3 into the first electrode of the light emitting element E0 under the control of the reset control signal provided by the reset control terminal S3.

When at least one embodiment of the pixel circuit shown in FIG. 7 of the present disclosure is working, In the first reset phase, the reset circuit 44 writes the reset voltage Vi3 provided by the reset voltage terminal I3 into the first electrode of the light emitting element E0 under the control of the reset control signal;

In the second reset phase, the reset circuit 44 writes the reset voltage Vi3 provided by the reset voltage terminal I3 into the first electrode of the light emitting element E0 under the control of the reset control signal.

Optionally, the compensation control circuit includes a third transistor, the first light emitting control circuit includes a fourth transistor, the second light emitting control circuit includes a fifth transistor, and the data writing-in circuit includes a sixth transistor, the driving circuit includes a driving transistor;

A control electrode of the third transistor is electrically connected to the compensation control terminal, a first electrode of the third transistor is electrically connected to the control terminal of the driving circuit, and a second electrode of the third transistor is electrically connected to the second terminal of the driving circuit;

A control electrode of the fourth transistor is electrically connected to the first light emitting control terminal, a first electrode of the fourth transistor is electrically connected to the power supply voltage terminal, and a second electrode of the fourth transistor is electrically connected to the first terminal of the driving circuit;

A control electrode of the fifth transistor is electrically connected to the second light emitting control terminal, a first electrode of the fifth transistor is electrically connected to the second terminal of the driving circuit, and a second electrode of the fifth transistor is electrically connected to the first electrode of the light emitting element;

A control electrode of the sixth transistor is electrically connected to the writing-in control terminal, a first electrode of the sixth transistor is electrically connected to the data line, and a second electrode of the sixth transistor is electrically connected to the first terminal of the driving circuit;

A control electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

In at least one embodiment of the present disclosure, the third transistor is an oxide thin film transistor.

Optionally, the reset circuit includes a seventh transistor;

A control electrode of the seventh transistor is electrically connected to the reset control terminal, a first electrode of the seventh transistor is electrically connected to the reset voltage terminal, and a second electrode of the seventh transistor is connected to the first electrode of the light emitting element.

In at least one embodiment of the present disclosure, the seventh transistor is an oxide thin film transistor.

Figure 8:
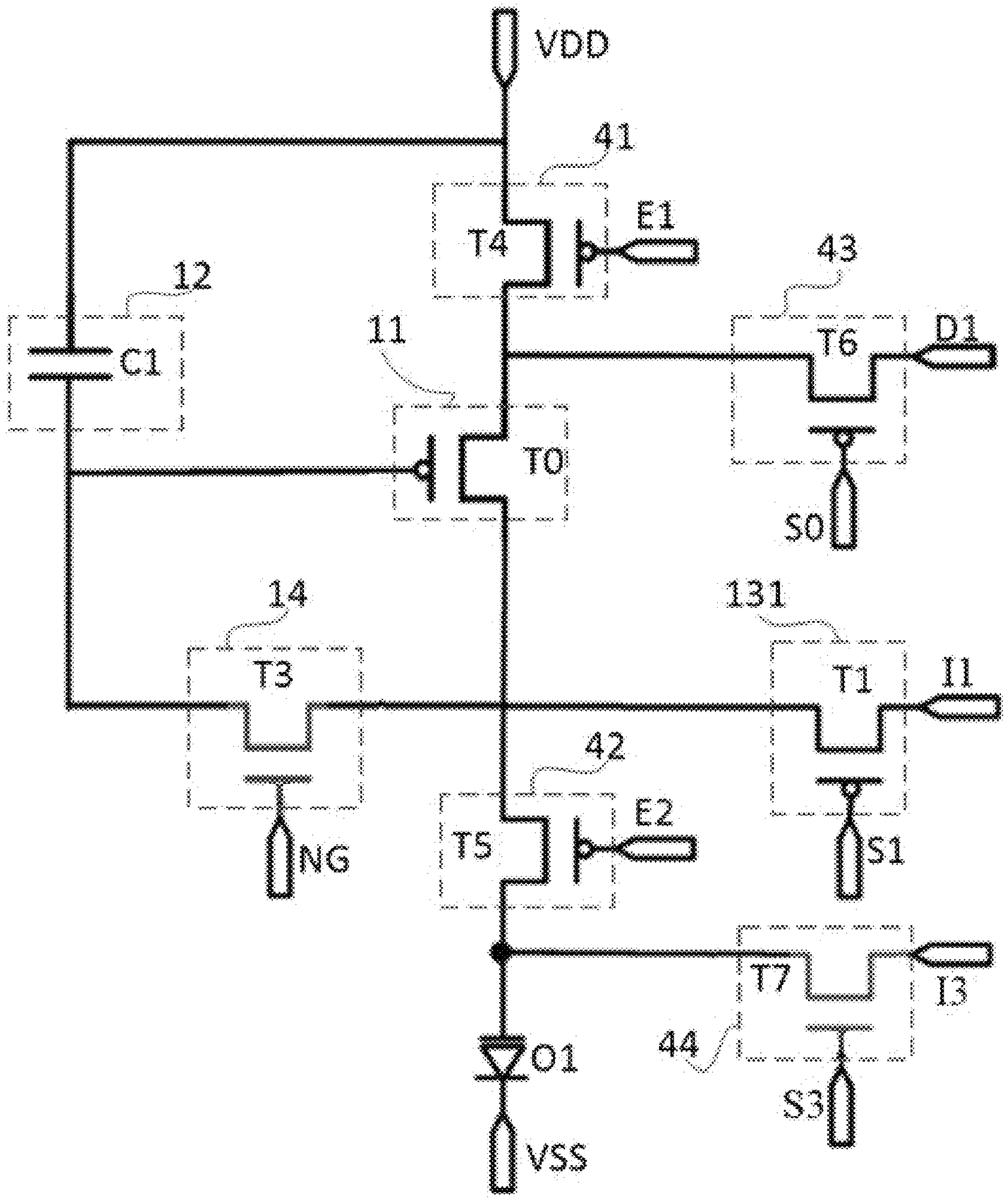
FIG. 8 is a circuit diagram of a pixel circuit according to at least one embodiment of the present disclosure.

As shown in FIG. 8, on the basis of at least one embodiment of the pixel circuit shown in FIG. 4, the first initialization sub-circuit 131 includes a first transistor T1; the driving circuit 11 includes a driving transistor TO; the light emitting component is an organic light emitting diode O1; the energy storage circuit 12 includes a storage capacitor C1;

The gate electrode of the first transistor T1 is electrically connected to the first initial control terminal S1, the source electrode of the first transistor T1 is electrically connected to the first initial voltage terminal I1, and the drain electrode of the first transistor T1 is electrically connected to the drain electrode of the driving transistor TO;

The compensation control circuit 14 includes a third transistor T3, the first light emitting control circuit 41 includes a fourth transistor T4, the second light emitting control circuit 42 includes a fifth transistor T5, and the data writing-in circuit 43 includes a sixth transistor T6;

The gate electrode of the third transistor T3 is electrically connected to the compensation control terminal NG, the source electrode of the third transistor T3 is electrically connected to the gate electrode of the driving transistor TO, and the drain electrode of the third transistor T3 is electrically connected to the drain electrode of the driving transistor TO;

The gate electrode of the fourth transistor T4 is electrically connected to the first light emitting control terminal E1, the source electrode of the fourth transistor T4 is electrically connected to the power supply voltage terminal VDD, and the drain electrode of the fourth transistor T4 is electrically connected to the source electrode of the driving transistor TO;

The gate electrode of the fifth transistor T5 is electrically connected to the second light emitting control terminal E2, the source electrode of the fifth transistor T5 is electrically connected to the drain electrode of the driving transistor TO, and the drain electrode of the fifth transistor T5 is electrically connected to the anode of the organic light emitting diode O1;

The gate electrode of the sixth transistor T6 is electrically connected to the writing-in control terminal S0, the source electrode of the sixth transistor T6 is electrically connected to the data line D1, and the drain electrode of the sixth transistor T6 is electrically connected to the source electrode of the driving transistor TO;

The reset circuit includes a seventh transistor T7;

The gate electrode of the seventh transistor T7 is electrically connected to the reset control terminal S3, the source electrode of the seventh transistor T7 is electrically connected to the reset voltage terminal I3, and the drain electrode of the seventh transistor T7 is electrically connected to the anode of the organic light emitting diode O1;

The cathode of the organic light emitting diode O1 is electrically connected to the low voltage terminal VSS;

A first terminal of the storage capacitor C1 is electrically connected to the gate electrode of the driving transistor TO, and a second terminal of the storage capacitor C1 is electrically connected to the power supply voltage terminal VDD.

In at least one embodiment of the pixel circuit shown in FIGS. 8, T3 and T7 are oxide thin film transistors, T1, T4, T5, T6 and TO are low temperature polysilicon (LTPS) thin film transistors, T3 and T7 are n-type transistors, T1, T4, T5, T6 and TO are p-type transistors, but not limited thereto.

Figure 9:
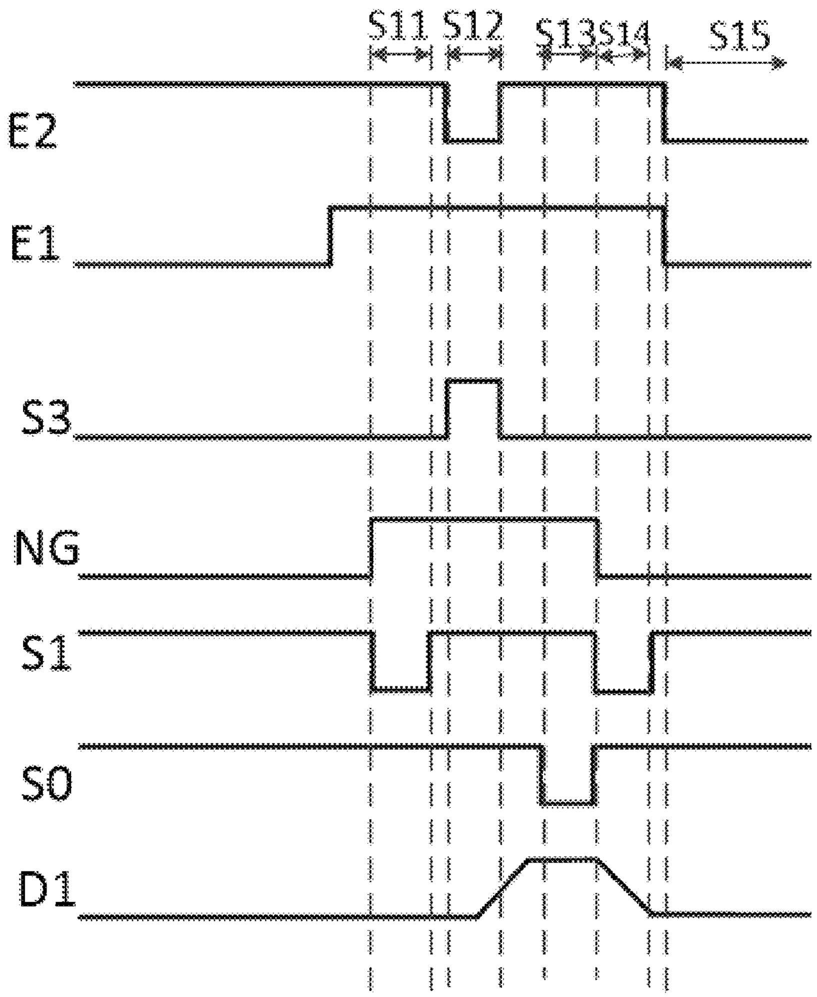
FIG. 9 is a working timing diagram of the pixel circuit shown in FIG. 8 of at least one embodiment of the present disclosure.
Figure 10A:
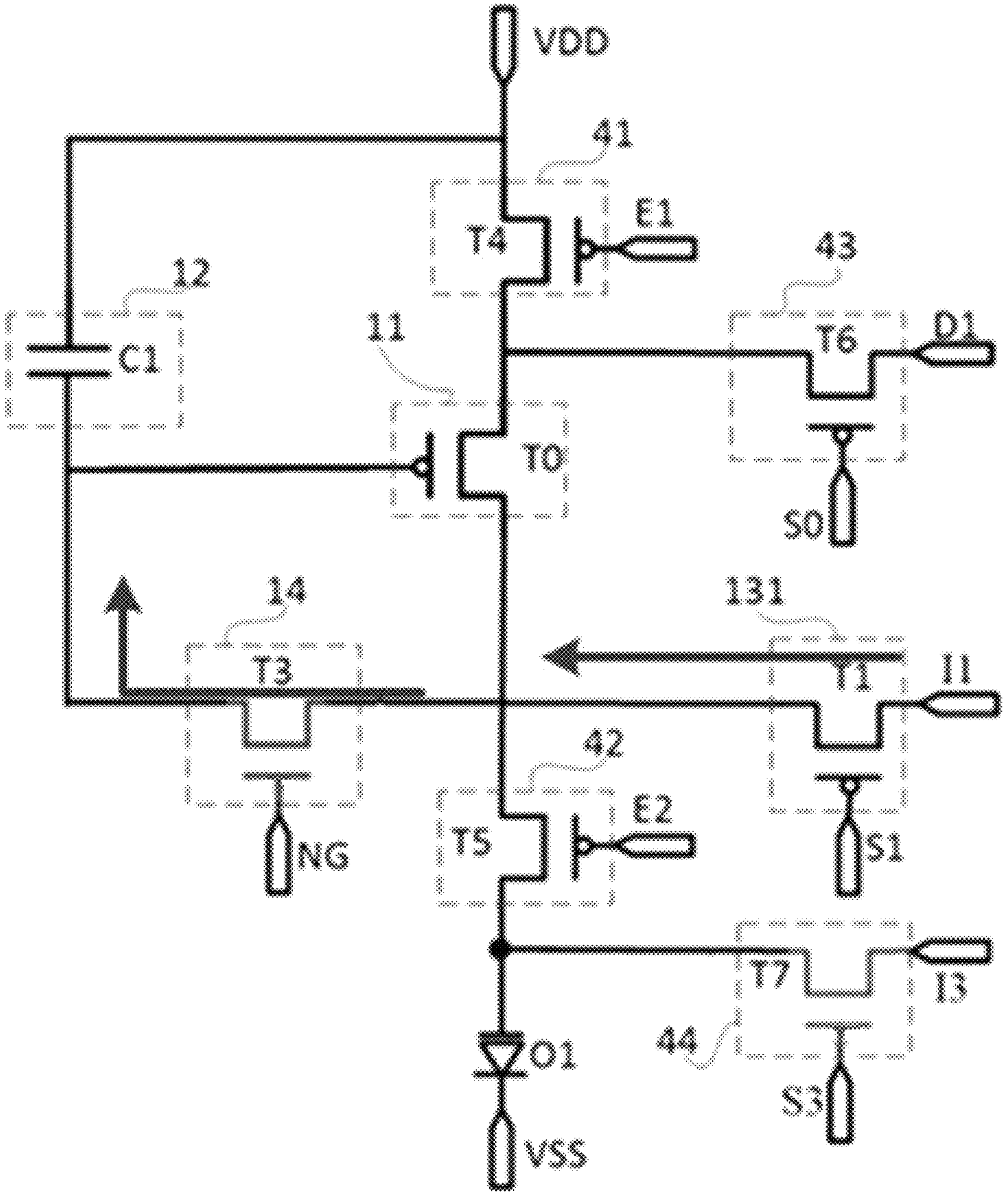
FIG. 10A is a schematic diagram of the working state of the pixel circuit shown in FIG. 8 in the first initialization phase S11 of at least one embodiment of the present disclosure.
Figure 10B:
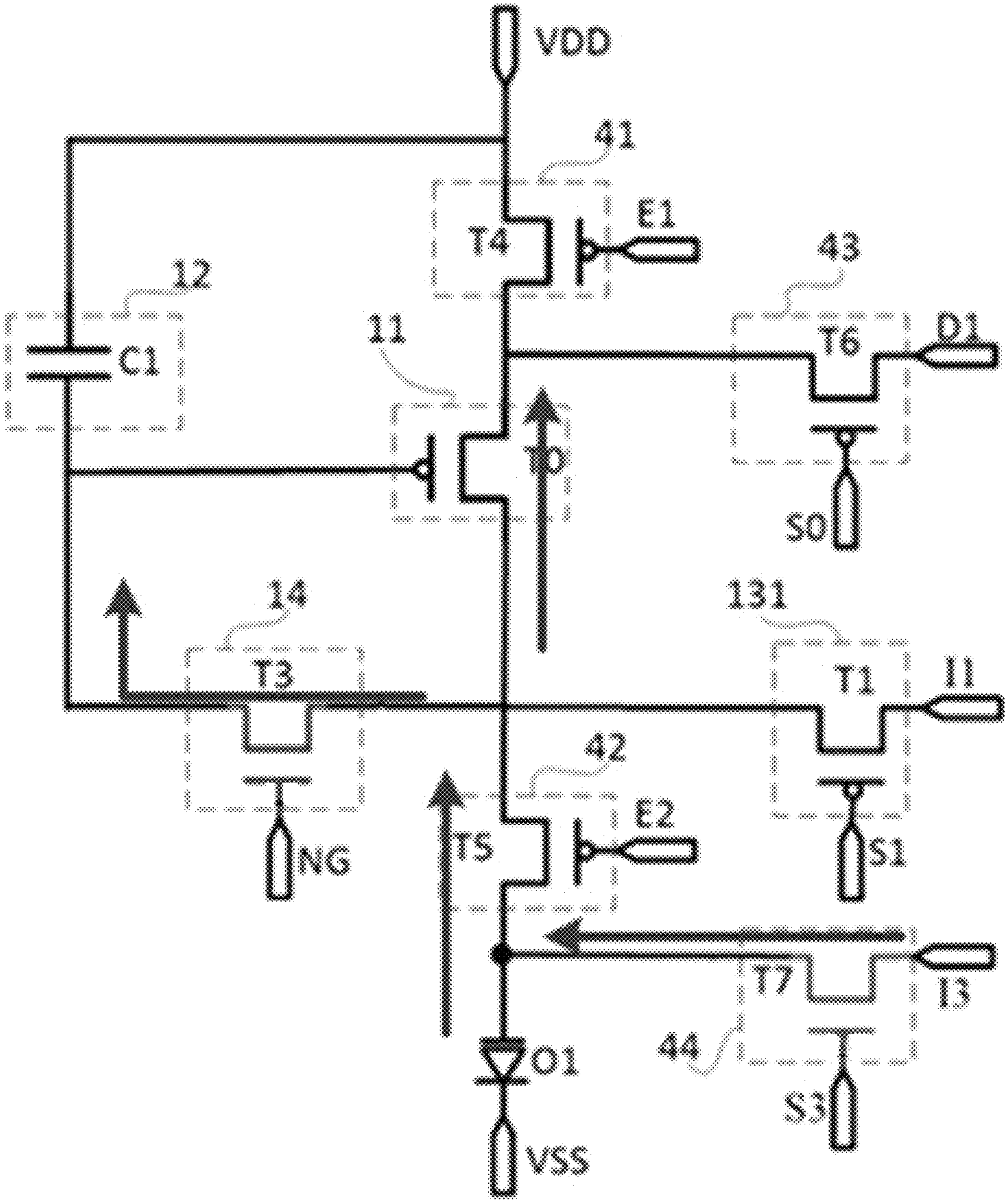
FIG. 10B is a schematic diagram of the working state of the pixel circuit shown in FIG. 8 in the first reset phase S12 of at least one embodiment of the present disclosure.
Figure 10C:
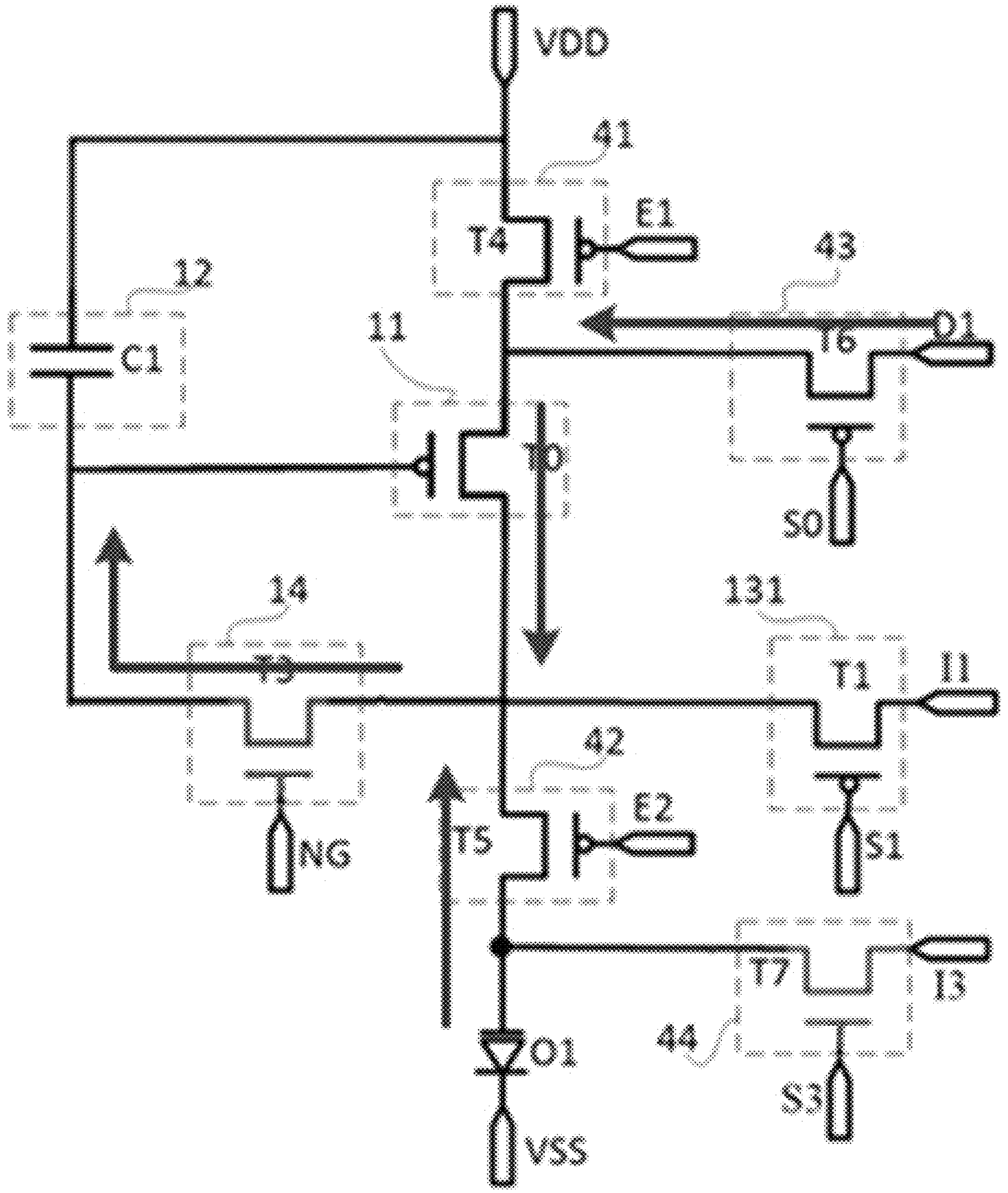
FIG. 10C is a schematic diagram of the working state of the pixel circuit shown in FIG. 8 in the first charging phase S13 of at least one embodiment of the present disclosure.
Figure 10D:
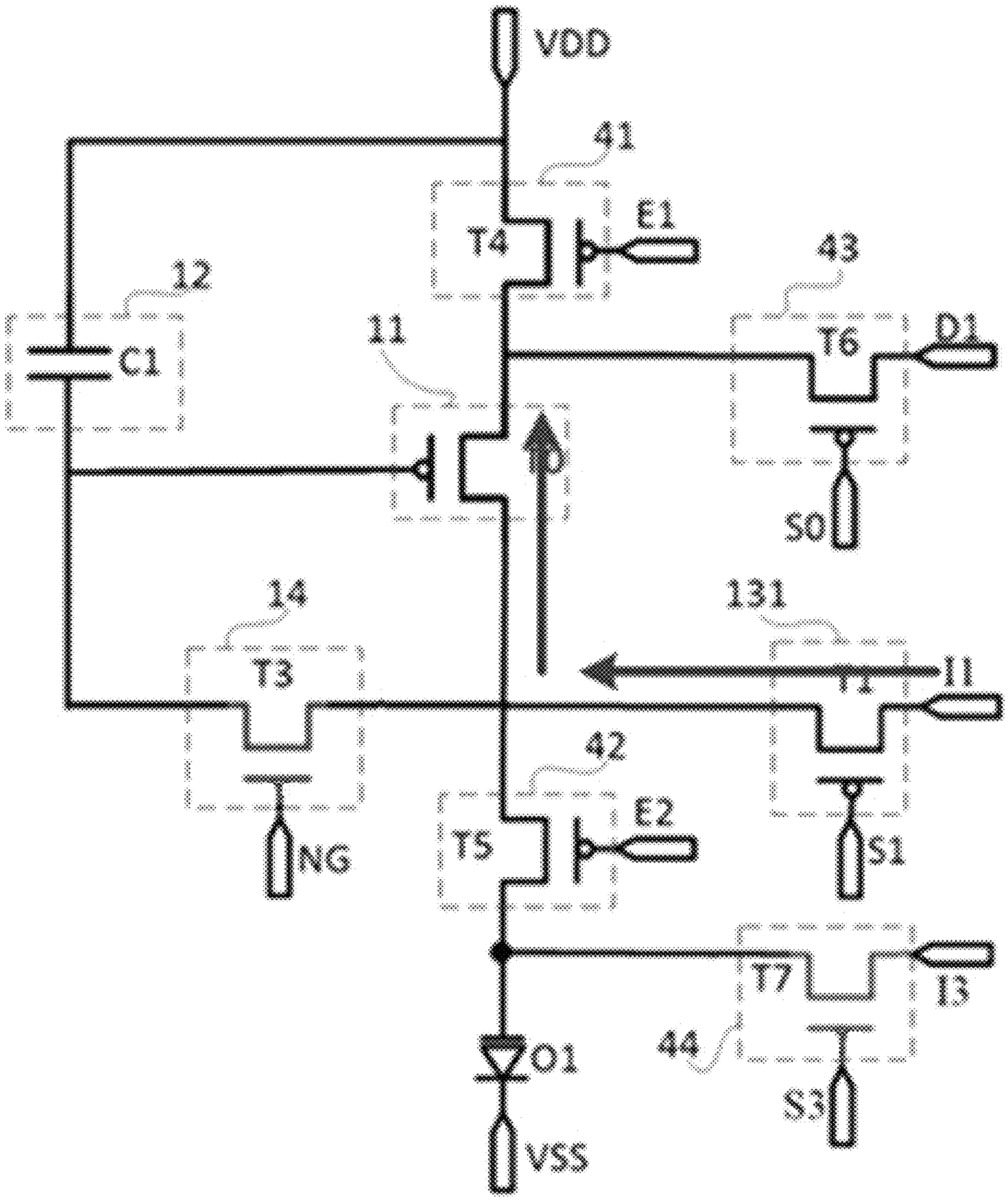
FIG. 10D is a schematic diagram of the working state of the pixel circuit shown in FIG. 8 in the first reset phase S14 of at least one embodiment of the present disclosure.
Figure 10E:
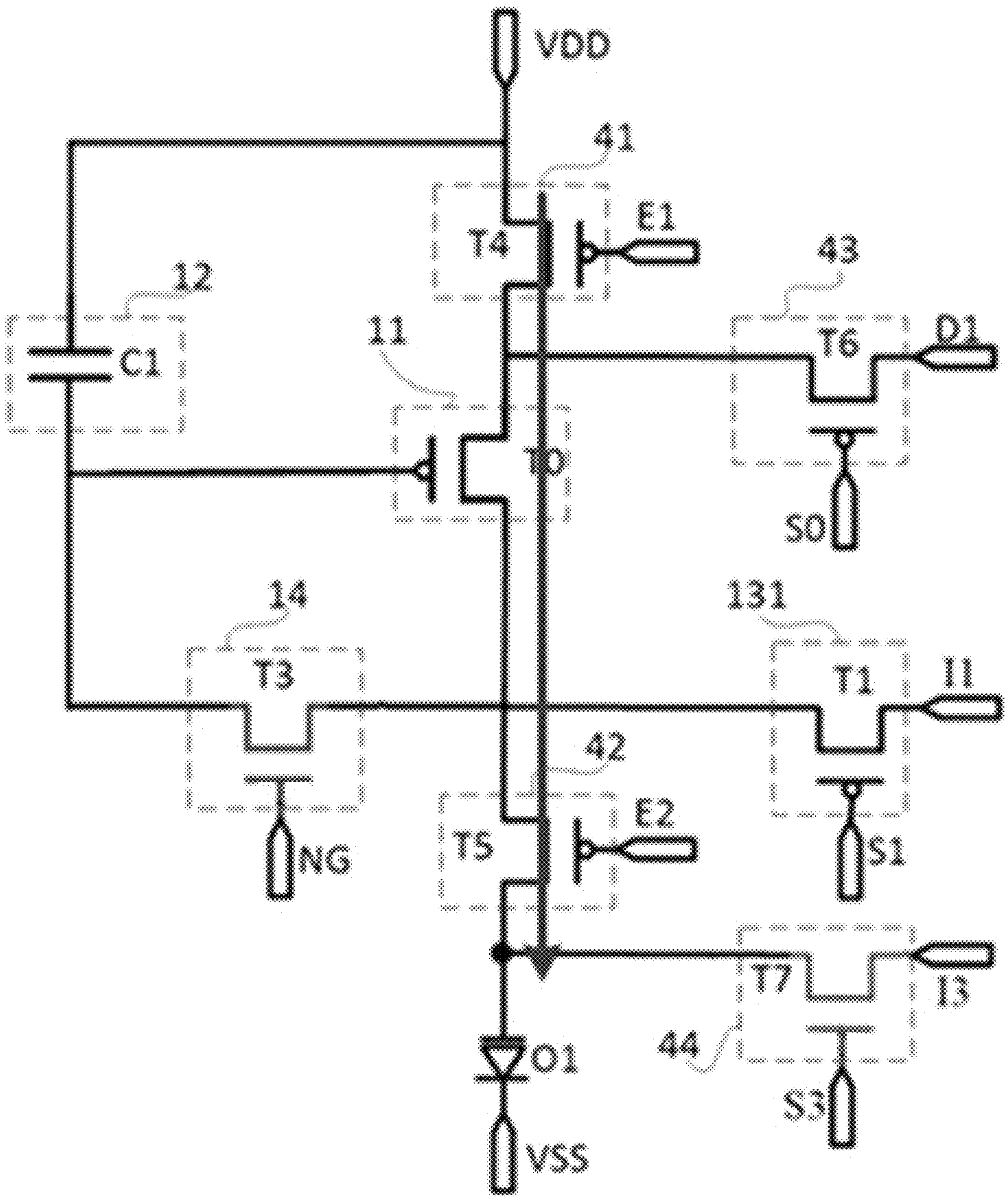
FIG. 10E is a schematic diagram of the working state of the pixel circuit shown in FIG. 8 in the first light emitting phase S15 of at least one embodiment of the present disclosure.

As shown in FIG. 9, when at least one embodiment of the pixel circuit shown in FIG. 8 of the present disclosure is working, the refresh frame includes the first initialization phase S11, the first reset phase S12, the first charging phase S13, the first set phase S14 and the first light emitting phase S15 set successively;

In the first initialization phase S11, E2 provides a high voltage signal, E1 provides a high voltage signal, S3 provides a low voltage signal, NG provides a high voltage signal, S1 provides a low voltage signal, S0 provides a high voltage signal, and I1 provides the first initial voltage Vi1, as shown in FIG. 10A, T1 is turned on, and T3 is turned on, so as to write the first initial voltage Vi1 into the drain electrode of TO and the gate electrode of TO, so as to initialize the drain voltage of TO and the gate voltage of TO; the first initial voltage Vi1 is a positive voltage, for example, Vi1 may be a 5V voltage signal, but not limited thereto;

In the first reset phase S12, E2 provides a low voltage signal, E1 provides a high voltage signal, S3 provides a high voltage signal, NG provides a high voltage signal, S1 provides a high voltage signal, S0 provides a high voltage signal, as shown in FIG. 10B, T7 is turned on, I3 provides the reset voltage Vi3, T5 is turned on, T3 is turned on, TO is turned on, so as to write the reset voltage Vi3 into the anode of O1, the drain electrode of TO, the gate electrode of TO and the source electrode of TO, so as to control O1 not to emit light, and remove the residual charge on the anode of O1, and reset the gate voltage of TO, the source voltage of TO and the drain voltage of TO, and so that TO is turned on when the first charging phase S13 begins; the reset voltage Vi3 may be a negative voltage, for example, Vi3 may be a −3V voltage signal, but not limited thereto;

In the first charging phase S13, E2 provides a high voltage signal, E1 provides a high voltage signal, S3 provides a low voltage signal, NG provides a high voltage signal, S1 provides a high voltage signal, S0 provides a low voltage signal, as shown in FIG. 10C, T6 is turned on, D1 provides data voltage Vdata; T3 is turned on; at the beginning of the first charging phase S13, TO is turned on, and the data voltage Vdata charges C1 through T6, TO and T3 to increase the gate voltage of TO until TO is turned off, at this time the gate voltage of TO is Vdata+Vth, and Vth is the threshold voltage of TO;

In the first set phase S14, E2 provides a high voltage signal, E1 provides a high voltage signal, S3 provides a low voltage signal, NG provides a low voltage signal, S1 provides a low voltage signal, S0 provides a high voltage signal, and I1 provides the first initial voltage Vi1, as shown in FIG. 10D, T1 is turned on, and TO is turned on, so as to reset the drain voltage of TO and the source voltage of TO to Vi1, so that TO is in a bias state, and the hysteresis is improved;

In the first light emitting phase S15, E2 provides a low voltage signal, E1 provides a low voltage signal, S3 provides a low voltage signal, NG provides a low voltage signal, S1 provides a high voltage signal, S0 provides a high voltage signal, as shown in FIG. 10E, T4 and T5 are turned on, and TO drives O1 to emit light.

During operation of the pixel circuit shown in FIG. 8 of at least one embodiment of the present disclosure, the voltage value of the first initial voltage Vi1 may be greater than or equal to 4V and less than or equal to 7V, and the voltage value of the reset voltage Vi3 may be greater than or equal to −4V and less than or equal to −2V, but not limited thereto.

Figure 11:
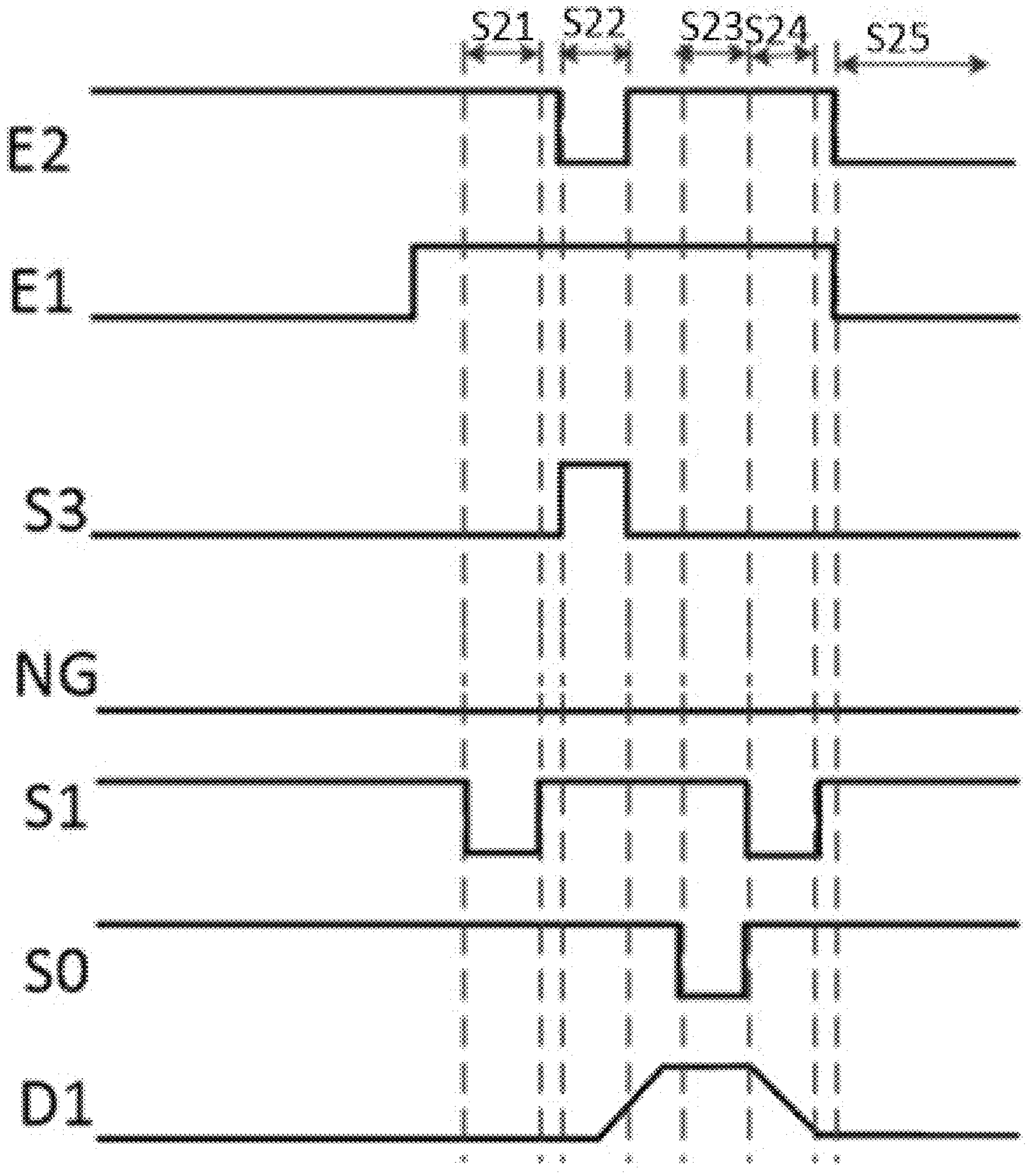
FIG. 11 is a working timing diagram of the pixel circuit shown in FIG. 8 of at least one embodiment of the present disclosure.

As shown in FIG. 11, when the pixel circuit shown in FIG. 8 of at least one embodiment of the present disclosure is in operation, the retention frame includes a second initialization phase S21, a second reset phase S22, and a retention set phase S23, the second set phase S24 and a second light emitting phase S25 set successively;

In the retention frame, NG provides a low voltage signal, and T3 is turned off, so as to control to disconnect the gate electrode of TO from the drain electrode of TO, so as to maintain the gate voltage of TO;

In the second initialization phase S21, E2 provides a high voltage signal, E1 provides a high voltage signal, S3 provides a low voltage signal, S1 provides a low voltage signal, S0 provides a high voltage signal, I1 provides the first initial voltage Vi1, T1 is turned on to write the first initial voltage Vi1 into the drain electrode of T0 to initialize the drain voltage of T0; the first initial voltage Vi1 is a positive voltage, for example, Vi1 can be a 5V voltage signal, but not limited thereto;

In the second reset phase S22, E2 provides a low voltage signal, E1 provides a high voltage signal, S3 provides a high voltage signal, S1 provides a high voltage signal, S0 provides a high voltage signal, T7 is turned on, I3 provides a reset voltage Vi3, and T5 is turned on to write the reset voltage Vi3 into the anode of O1 and the drain electrode of T0 to control O1 not to emit light, remove the residual charge on the anode of O1, and reset the drain voltage of T0; the reset voltage Vi3 can be negative voltage, for example, Vi3 can be a −3V voltage signal, but not limited thereto;

In the retention set phase S23, E2 provides a high voltage signal, E1 provides a high voltage signal, S3 provides a low voltage signal, S1 provides a high voltage signal, S0 provides a low voltage signal, T6 is turned on, and D1 provides a voltage signal to the source electrode of T0;

In the retention set phase S23, the voltage signal provided by D1 can be a positive voltage to set the source voltage of T0, thereby providing a bias voltage to the driving transistor T0, so that T0 is in a bias state to improve the hysteresis;

In the second reset phase S24, E2 provides a high voltage signal, E1 provides a high voltage signal, S3 provides a low voltage signal, S1 provides a low voltage signal, S0 provides a high voltage signal, I1 provides the first initial voltage Vi1, T1 is turned on, T0 is turned on to reset the drain voltage of T0 and the source voltage of T0 to Vi1, so that T0 is in a bias state and improve hysteresis;

In the second light emitting phase S25, E2 provides a low voltage signal, E1 provides a low voltage signal, S3 provides a low voltage signal, S1 provides a high voltage signal, S0 provides a high voltage signal, T4 and T5 are turned on, and T0 drives O1 to emit light.

In a specific implementation, in the retention reset phase, the voltage signal provided by the data line D1 may be a data voltage Vdata, and the data voltage Vdata is the data voltage provided by the data line D1 in the first charging phase, the voltage value range of the data voltage Vdata may be, for example, greater than or equal to 1V and less than or equal to 6.5V; or, In the retention reset phase, the voltage signal provided by the data line D1 may be a reset voltage signal, and the voltage value range of the reset voltage signal may be greater than or equal to 4.6V and less than or equal to 7V; but not limited to this.

At least one embodiment of the pixel circuit shown in FIG. 8 of the present disclosure is in operation. When displaying at a low frequency, the display period includes a refresh frame and a retention frame. In the second reset phase in the retention frame, the driving transistor included in the above driving circuit is biased so that in the second reset phase in the retention frame, the potential of the source electrode of the driving transistor in the driving circuit and the potential of the drain electrode of the driving transistor are consistent with the refresh frame, which can improve flicker.

Figure 12:
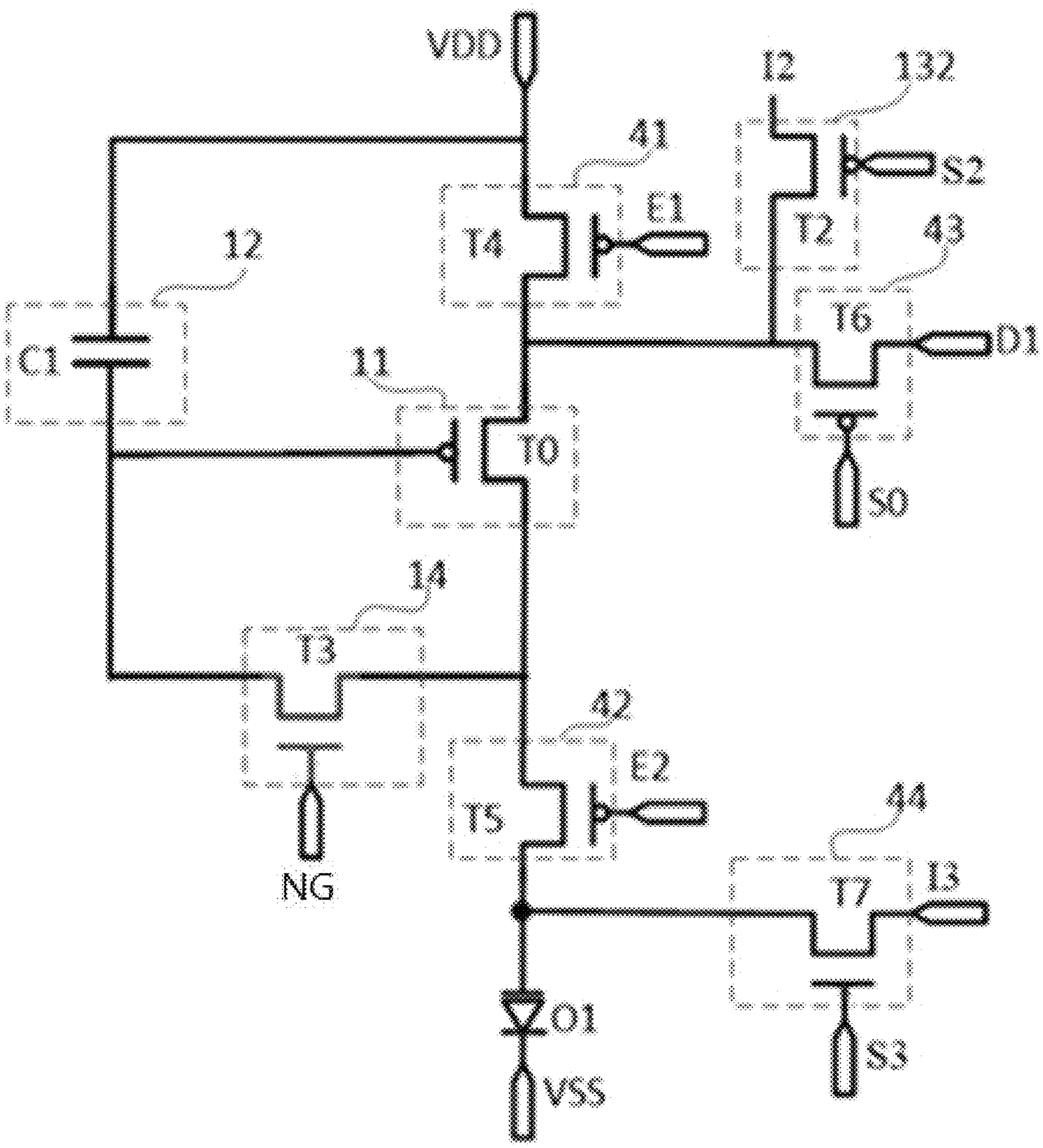
FIG. 12 is a circuit diagram of a pixel circuit according to at least one embodiment of the present disclosure.

As shown in FIG. 12, on the basis of at least one embodiment of the pixel circuit shown in FIG. 5, the second initialization sub-circuit 132 includes a second transistor T2; the driving circuit 11 includes a driving transistor T0; the light emitting element is an organic light emitting diode O1; the energy storage circuit 12 includes a storage capacitor C1;

The gate electrode of the second transistor T2 is electrically connected to the second initial control terminal S2, the source electrode of the second transistor T2 is electrically connected to the second initial voltage terminal I2, and the drain electrode of the second transistor T2 is electrically connected to the source electrode of the driving transistor T0;

The compensation control circuit 14 includes a third transistor T3, the first light emitting control circuit 41 includes a fourth transistor T4, the second light emitting control circuit 42 includes a fifth transistor T5, and the data writing-in circuit 43 includes a sixth transistor T6;

The gate electrode of the third transistor T3 is electrically connected to the compensation control terminal NG, the source electrode of the third transistor T3 is electrically connected to the gate electrode of the driving transistor T0, and the drain electrode of the third transistor T3 is electrically connected to the drain electrode of the driving transistor T0;

The gate electrode of the fourth transistor T4 is electrically connected to the first light emitting control terminal E1, the source electrode of the fourth transistor T4 is electrically connected to the power supply voltage terminal VDD, and the drain electrode of the fourth transistor T4 is electrically connected to the source electrode of the driving transistor T0;

The gate electrode of the fifth transistor T5 is electrically connected to the second light emitting control terminal E2, the source electrode of the fifth transistor T5 is electrically connected to the drain electrode of the driving transistor T0, and the drain electrode of the fifth transistor T5 is electrically connected to the anode of the organic light emitting diode O1;

The gate electrode of the sixth transistor T6 is electrically connected to the writing-in control terminal S0, the source electrode of the sixth transistor T6 is electrically connected to the data line D1, and the drain electrode of the sixth transistor T6 is electrically connected to the source electrode of the driving transistor T0;

The reset circuit 44 includes a seventh transistor T7;

The gate electrode of the seventh transistor T7 is electrically connected to the reset control terminal S3, the source electrode of the seventh transistor T7 is electrically connected to the reset voltage terminal I3, and the drain electrode of the seventh transistor T7 is electrically connected to the anode of the organic light emitting diode O1;

The cathode of the organic light emitting diode O1 is electrically connected to the low voltage terminal VSS;

A first terminal of the storage capacitor C1 is electrically connected to the gate electrode of the driving transistor T0, and a second terminal of the storage capacitor C1 is electrically connected to the power supply voltage terminal VDD.

In at least one embodiment of the pixel circuit shown in FIG. 12, T3 is an oxide thin film transistor, T2, T4, T5, T6, T7 and T0 are low temperature polysilicon (LTPS) thin film transistors, T3 is an n-type transistor, T2, T4, T5, T6, T7 and T0 are p-type transistors, but not limited thereto.

Figure 13:
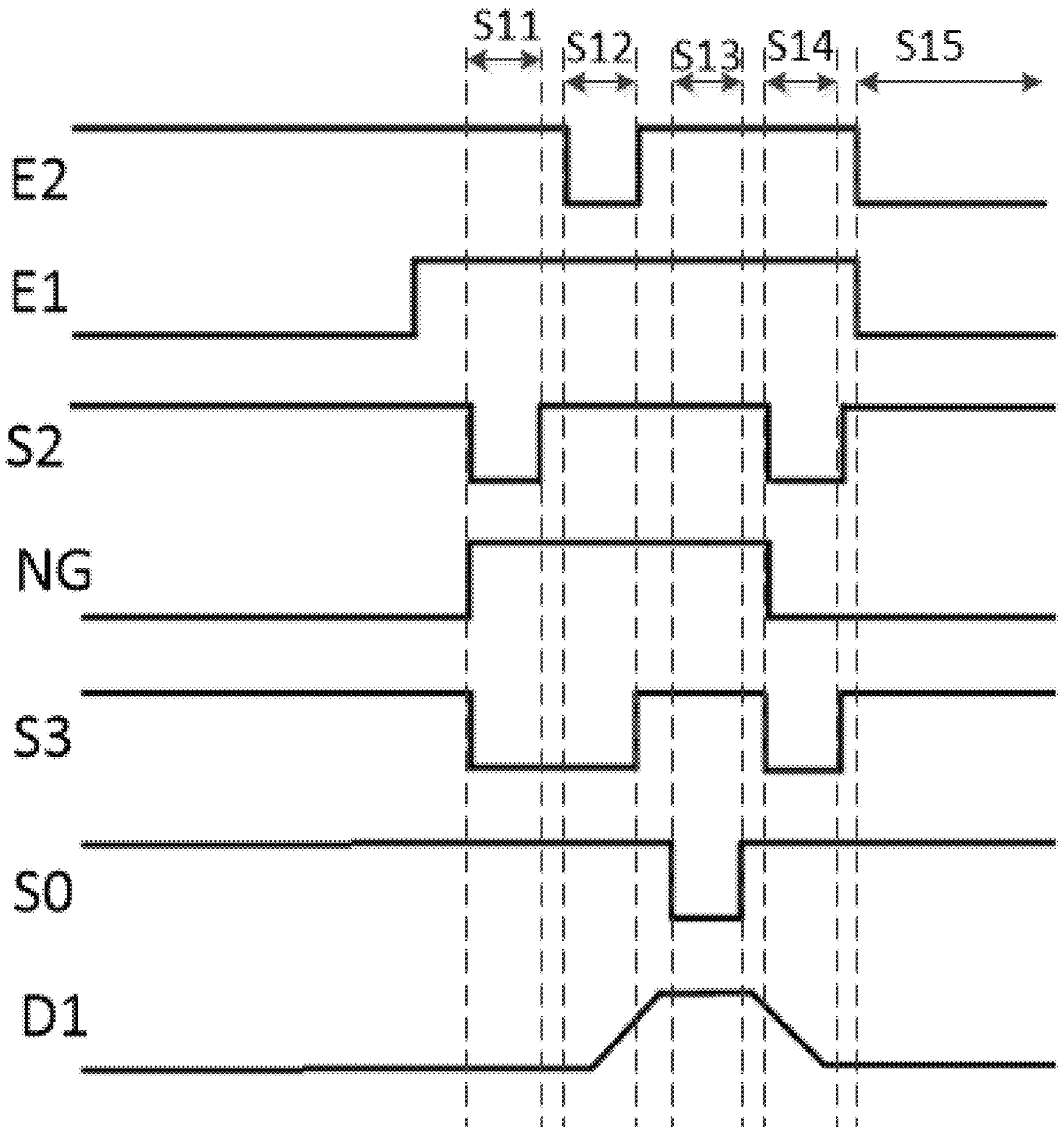
FIG. 13 is a working timing diagram of the pixel circuit shown in FIG. 11 of at least one embodiment of the present disclosure.
Figure 14A:
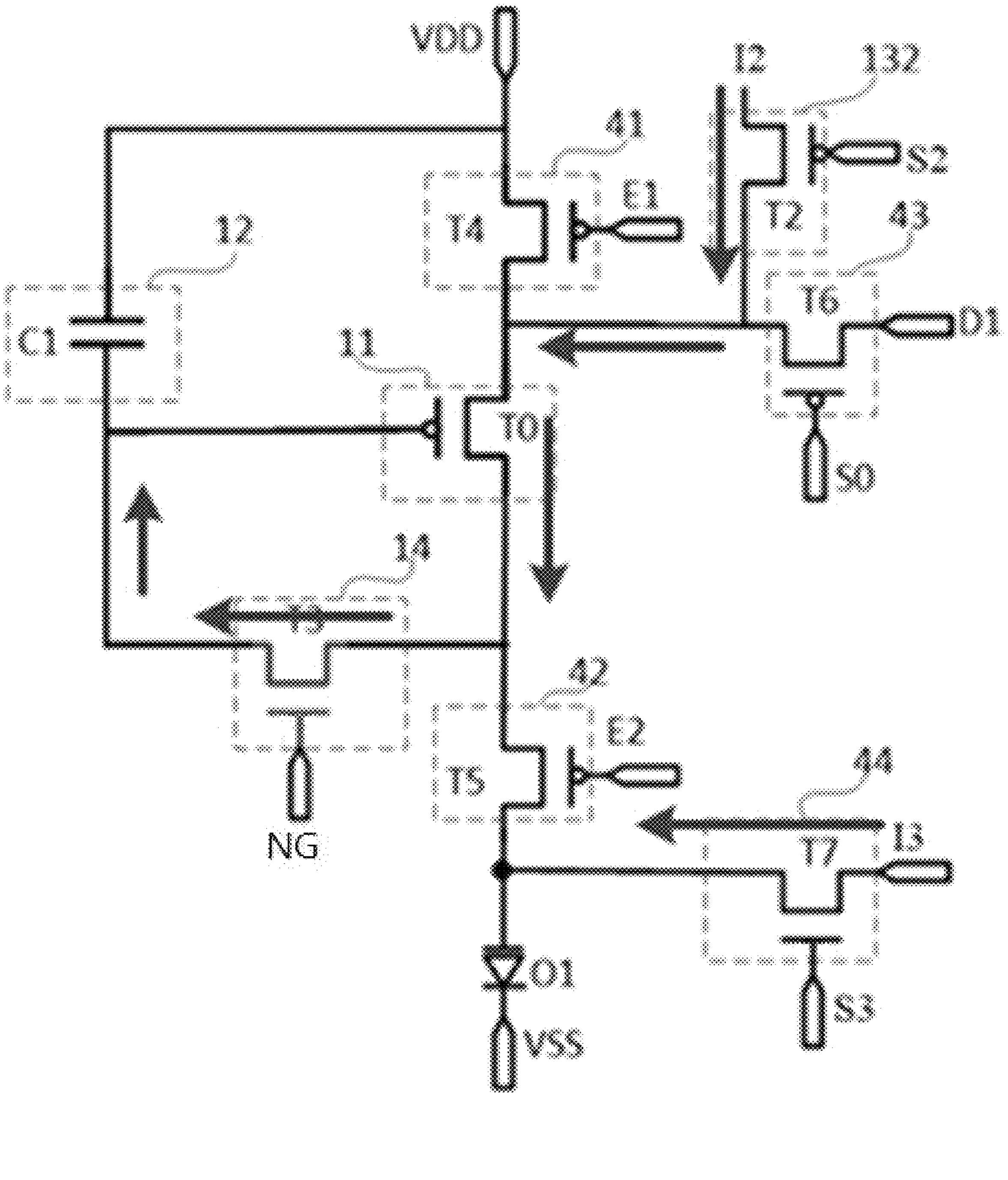
FIG. 14A is a schematic diagram of the working state of the pixel circuit shown in FIG. 12 in the first initialization phase S11 of at least one embodiment of the present disclosure.
Figure 14B:
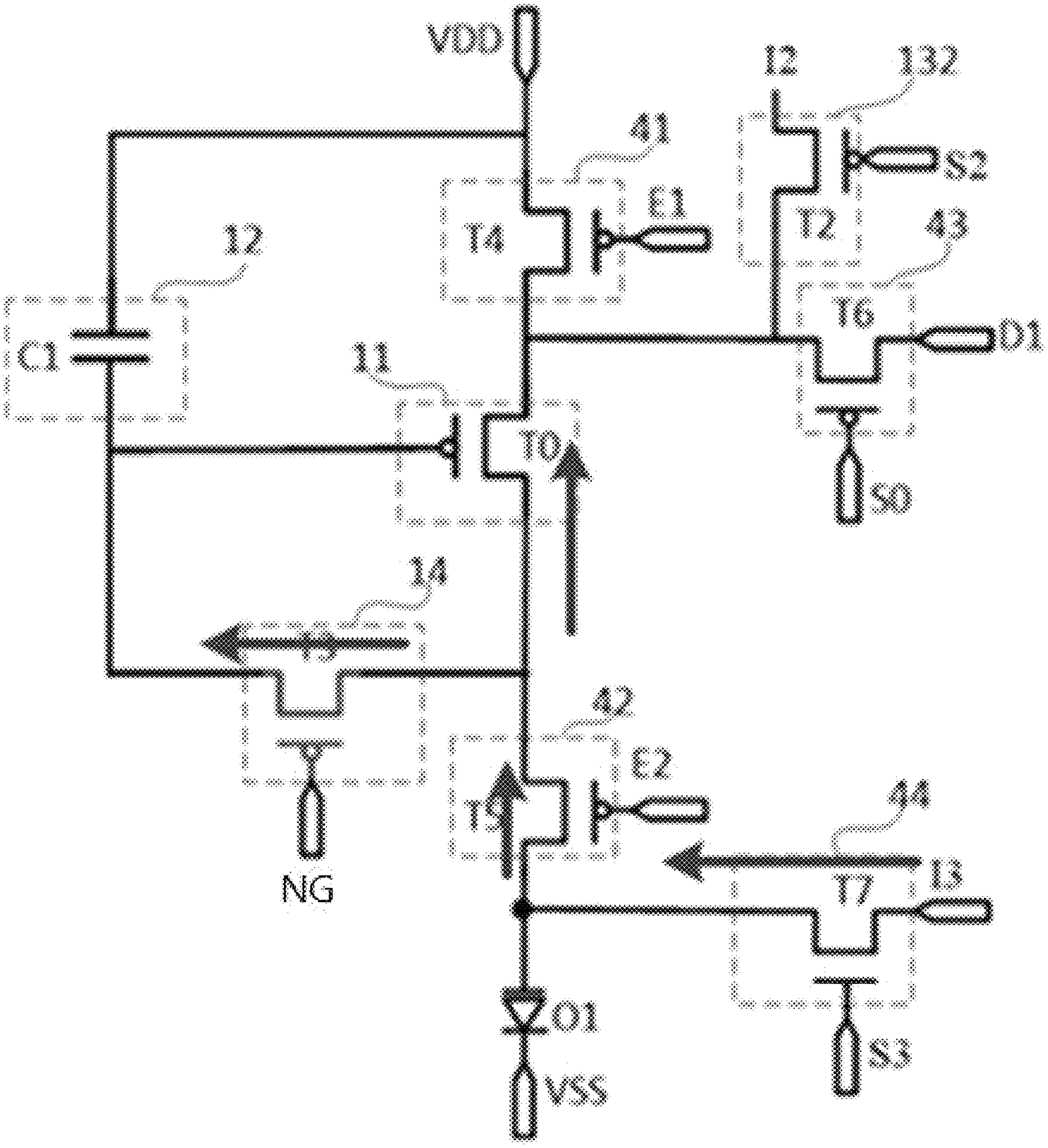
FIG. 14B is a schematic diagram of the working state of the pixel circuit shown in FIG. 12 in the first reset phase S12 of at least one embodiment of the present disclosure.
Figure 14C:
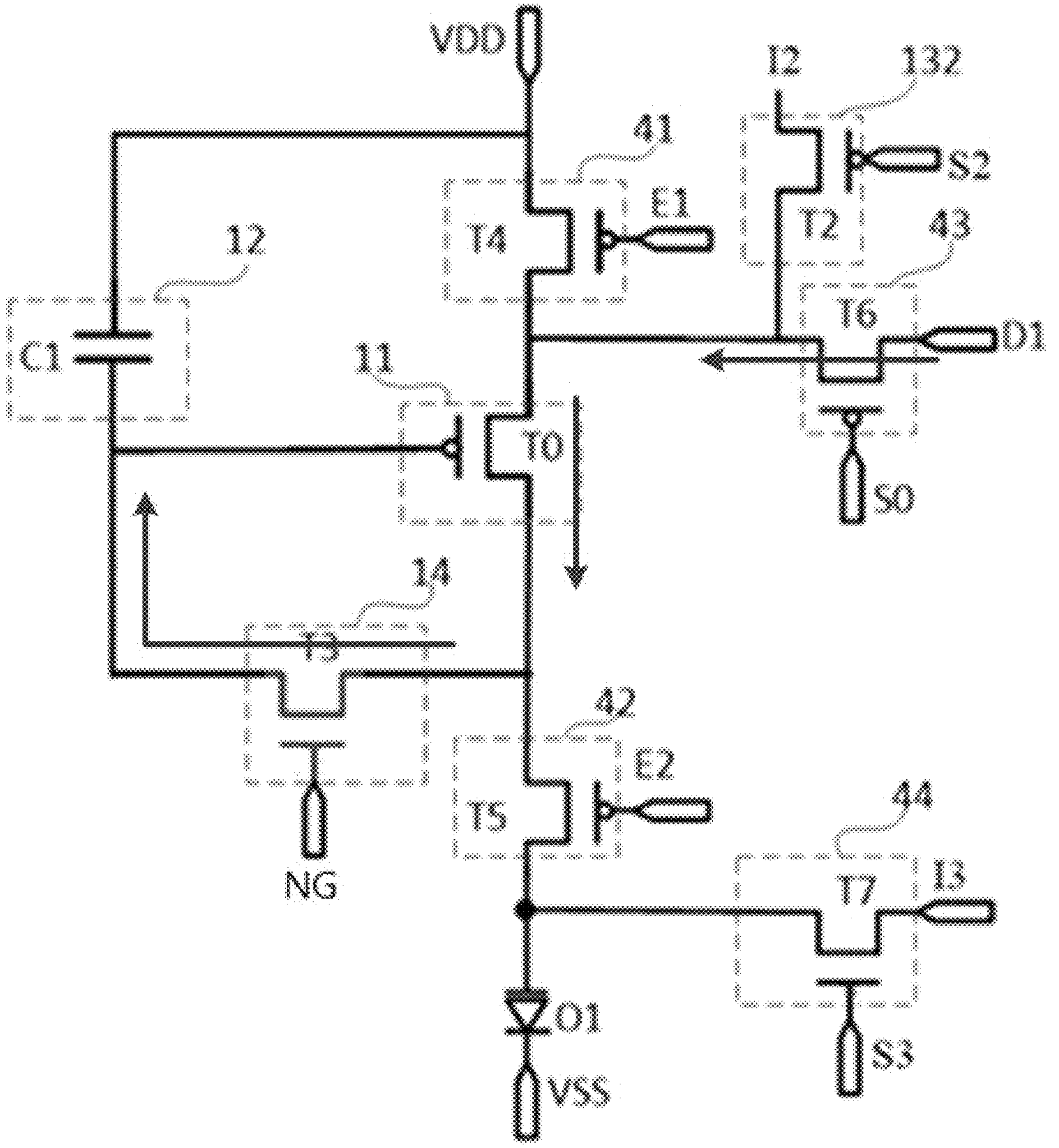
FIG. 14C is a schematic diagram of the working state of the pixel circuit shown in FIG. 12 in the first charging phase S13 of at least one embodiment of the present disclosure.
Figure 14D:
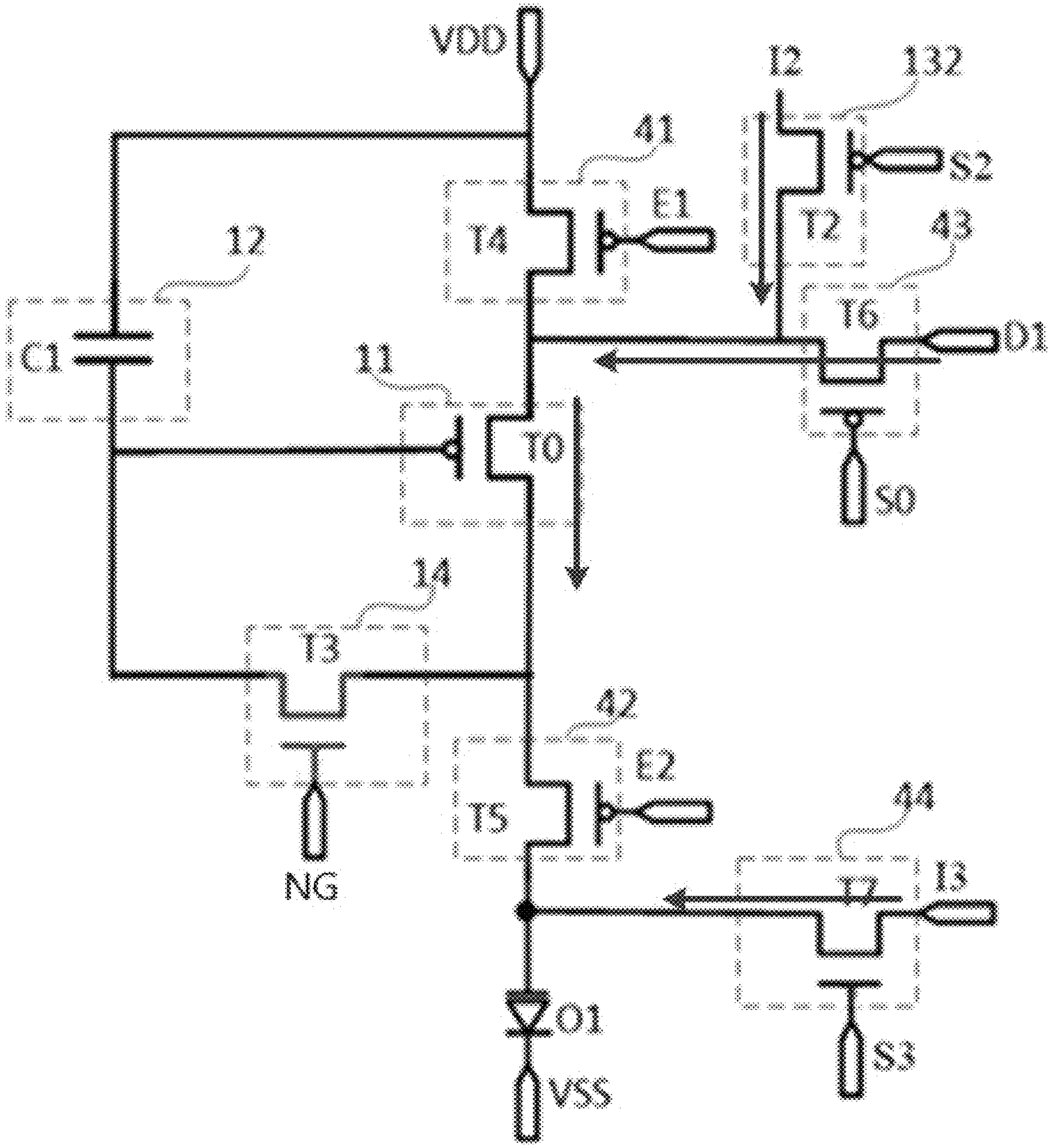
FIG. 14D is a schematic diagram of the working state of the pixel circuit shown in FIG. 12 in the first reset phase S14 of at least one embodiment of the present disclosure.
Figure 14E:
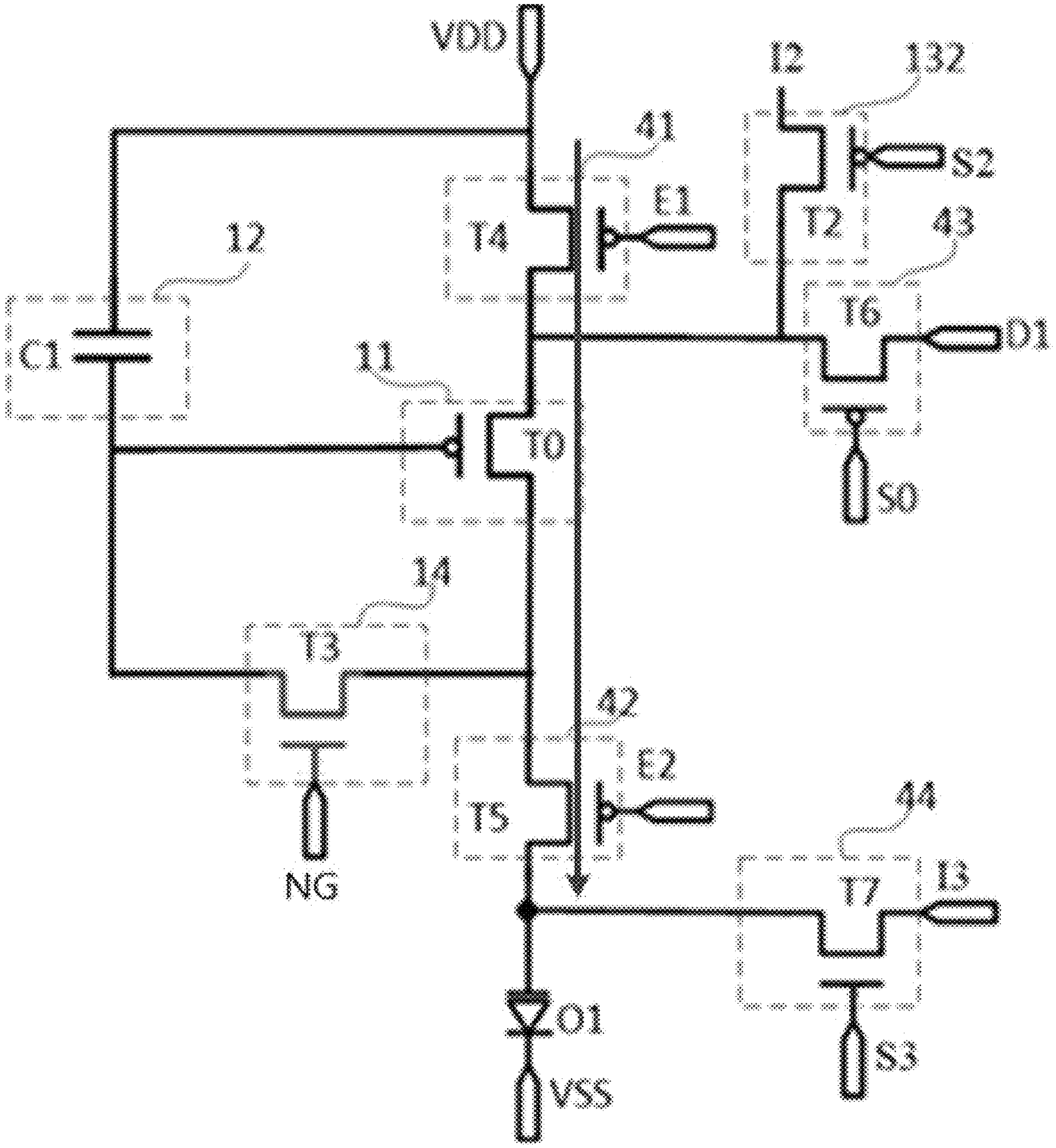
FIG. 14E is a schematic diagram of the working state of the pixel circuit shown in FIG. 12 in the first light emitting phase S15 of at least one embodiment of the present disclosure.

As shown in FIG. 13, when at least one embodiment of the pixel circuit shown in FIG. 12 is in operation, the refresh frame includes a first initialization phase S11, a first reset phase S12, a first charging phase S13, a first reset phase S14 and a first light emitting phase S15;

In the first initialization phase S11, E2 provides a high voltage signal, E1 provides a high voltage signal, S2 provides a low voltage signal, NG provides a high voltage signal, S3 provides a low voltage signal, S0 provides a high voltage signal, and I2 provides a second initial voltage Vi2, I3 provides a reset voltage Vi3, Vi2 is a positive voltage, and Vi3 is a negative voltage; for example, Vi2 can be a 5V voltage signal, and Vi3 can be a −3V voltage signal; as shown in FIG. 14A, T7 is turned on to write Vi3 into the anode of O1, so that O1 does not emit light, and remove the residual charge on the anode of O1; T2 is turned on, T0 is turned on, and T3 is turned on to initialize the source voltage of T0, the drain voltage of T0 and the gate voltage of T0;

In the first reset phase S12, E2 provides a low voltage signal, E1 provides a high voltage signal, S2 provides a high voltage signal, NG provides a high voltage signal, S3 provides a low voltage signal, S0 provides a high voltage signal, and I3 provides a reset voltage Vi3; As shown in FIG. 14B, T7 is turned on to write Vi3 into the anode of O1, so that O1 does not emit light, and removes the residual charge on the anode of O1; T3 is turned on, T0 is turned on, so that Vi3 is written into the gate electrode of T0 and the drain electrode of T0 and the source electrode of T0, so that T0 can be turned on at the beginning of the first charging phase S13;

In the first charging phase S13, E2 provides a high voltage signal, E1 provides a high voltage signal, S2 provides a high voltage signal, NG provides a high voltage signal, S3 provides a high voltage signal, S0 provides a low voltage signal, and D1 provides a data voltage Vdata, as shown in FIG. 14C, T6 is turned on, and T3 is turned on;

At the beginning of the first charging phase S13, T0 is turned on, and Vdata charges C1 through T6, T0 and T3 until T0 is turned off, at which time the gate voltage of T0 is Vdata+Vth;

In the first reset phase S14, E2 provides a high voltage signal, E1 provides a high voltage signal, S2 provides a low voltage signal, NG provides a low voltage signal, S3 provides a low voltage signal, S0 provides a high voltage signal, and I2 provides a second initial voltage Vi2, as shown in FIG. 14D, T2 is turned on, T0 is turned on, and T7 is turned on to write Vi2 into the source electrode of T0 and the drain electrode of T0 to reset the drain voltage of T0 and the source voltage of T0 to Vi2, so that T0 is in a bias state, to improve the hysteresis; and write Vi3 into the anode of O1, control O1 not to emit light, and remove the residual charge of the anode of O1;

In the first light emitting phase S15, E2 provides a low voltage signal, E1 provides a low voltage signal, S2 provides a high voltage signal, NG provides a low voltage signal, S3 provides a high voltage signal, S0 provides a high voltage signal, as shown in FIG. 14E, T4 and T5 are turned on, and T0 drives O1 to emit light.

Figure 15:
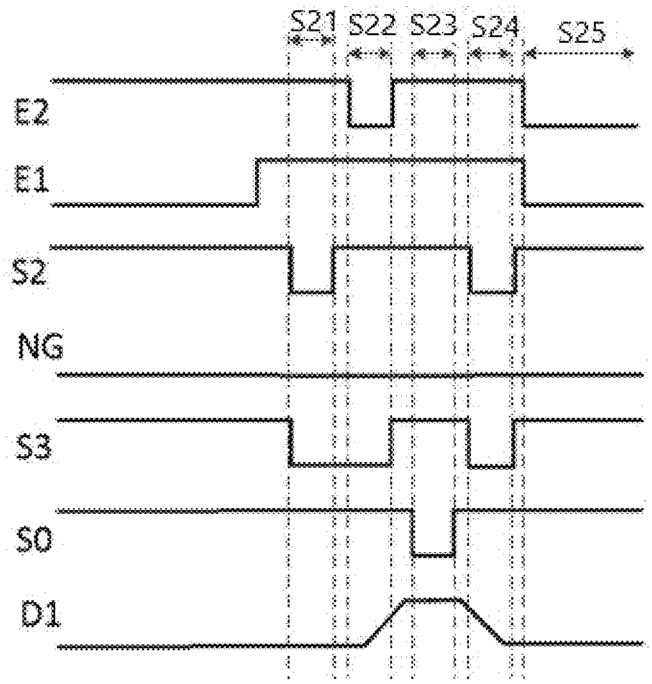
FIG. 15 is a working timing diagram of the pixel circuit shown in FIG. 12 of at least one embodiment of the present disclosure.

As shown in FIG. 15, when at least one embodiment of the pixel circuit shown in FIG. 12 is in operation, the retention frame includes a second initialization phase S21, a second reset phase S22, a retention set phase S23, a second set phase S24 and a second light emitting phase S25;

In the retention frame, NG provides a low voltage signal, and T3 is turned off, so as to control to disconnect the gate electrode of T0 from the drain electrode of T0, so as to maintain the gate voltage of T0;

In the second initialization phase S21, E2 provides a high voltage signal, E1 provides a high voltage signal, S2 provides a low voltage signal, S3 provides a low voltage signal, S0 provides a high voltage signal, I2 provides a second initial voltage Vi2, and I3 provides a reset voltage Vi3, Vi2 is a positive voltage, and Vi3 is a negative voltage; for example, Vi2 can be a 5V voltage signal, and Vi3 can be a −3V voltage signal; T7 is turned on to write Vi3 into the anode of O1, so that O1 does not emit light, and remove the residual charge on the anode of O1; T2 is turned on, T0 is turned on to initialize the source voltage of T0 and the drain voltage of T0;

In the second reset phase S22, E2 provides a low voltage signal, E1 provides a high voltage signal, S2 provides a high voltage signal, S3 provides a low voltage signal, S0 provides a high voltage signal, I3 provides a reset voltage Vi3; T7 is turned on to write Vi3 into the anode of O1, so that O1 does not emit light, and remove the residual charge of the anode of O1; T0 is turned on, so that Vi3 can be written into the drain electrode of T0 and the source electrode of T0;

In the hold set phase S23, E2 provides a high voltage signal, E1 provides a high voltage signal, S2 provides a high voltage signal, S3 provides a high voltage signal, S0 provides a low voltage signal, D1 provides a voltage signal, T6 is turned on, and D1 provides a voltage signal to source electrode of T0;

In the hold setting phase S23, the voltage signal provided by D1 can be a positive voltage to set the source voltage of T0, thereby providing a bias voltage to the driving transistor T0, so that T0 is in a bias state to improve the hysteresis;

In the second reset phase S24, E2 provides a high voltage signal, E1 provides a high voltage signal, S2 provides a low voltage signal, S3 provides a low voltage signal, S0 provides a high voltage signal, I2 provides a second initial voltage Vi2, T2 is turned on, T0 is turned on, T7 is turned on to write Vi2 to the source electrode of T0 and the drain electrode of T0 to reset the drain voltage of T0 and the source voltage of T0 to Vi2, so that T0 is in a biased state, thereby improving hysteresis; and write Vi3 into the anode of O1, control O1 not to emit light, and remove the residual charge of the anode of O1;

In the second light emitting phase S25, E2 provides a low voltage signal, E1 provides a low voltage signal, S2 provides a high voltage signal, S3 provides a high voltage signal, T4 and T5 are turned on, and T0 drives O1 to emit light.

In a specific implementation, in the retention reset phase, the voltage signal provided by the data line D1 may be a data voltage Vdata, and the data voltage Vdata is the data voltage provided by the data line D1 in the first charging phase, the voltage value range of the data voltage Vdata may be, for example, greater than or equal to 1V and less than or equal to 6.5V; or, In the retention reset phase, the voltage signal provided by the data line D1 may be a reset voltage signal, and the voltage value range of the reset voltage signal may be greater than or equal to 4.6V and less than or equal to 7V; but not limited to this.

Figure 16:
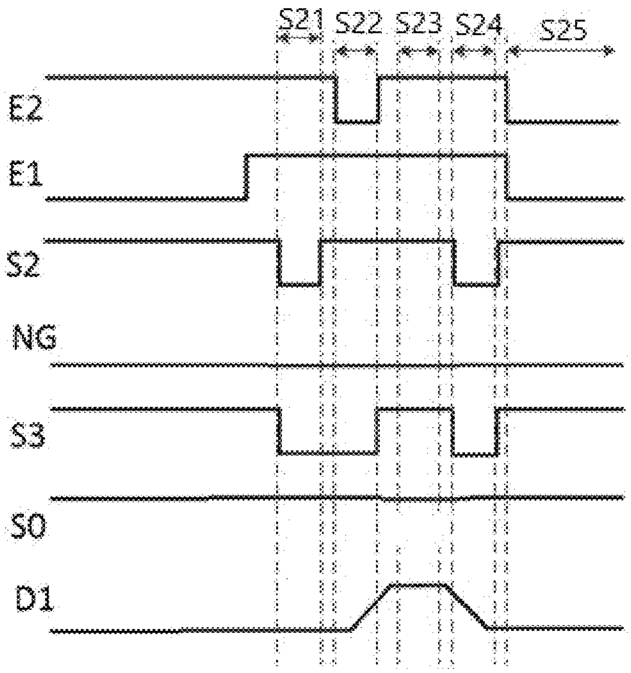
FIG. 16 is a working timing diagram of the pixel circuit shown in FIG. 12 of at least one embodiment of the present disclosure.

FIG. 16 is a second working timing diagram of the pixel circuit in the retention frame shown in FIG. 12 in at least one embodiment of the present disclosure.

The difference between FIG. 16 and FIG. 15 is that: in the retention frame, S0 provides a high voltage signal, T6 is turned off, and stops writing the voltage signal provided by D1 into the source electrode of T0.

During operation of the pixel circuit shown in FIG. 12 of at least one embodiment of the present disclosure, the voltage value of the second initial voltage Vi2 may be greater than or equal to 4V and less than or equal to 7V, and the voltage value of the reset voltage Vi3 may be greater than or equal to −4V and less than or equal to −2V, but not limited thereto.

At least one embodiment of the pixel circuit shown in FIG. 12 of the present disclosure is working. When displaying at a low frequency, the display period includes a refresh frame and a retention frame. The driving transistor included in the above driving circuit is biased so that in the second reset phase in the retention frame, the potential of the source electrode of the driving transistor in the driving circuit and the potential of the drain electrode of the driving transistor are consistent with the refresh frame, which can improve flicker.

Figure 17:
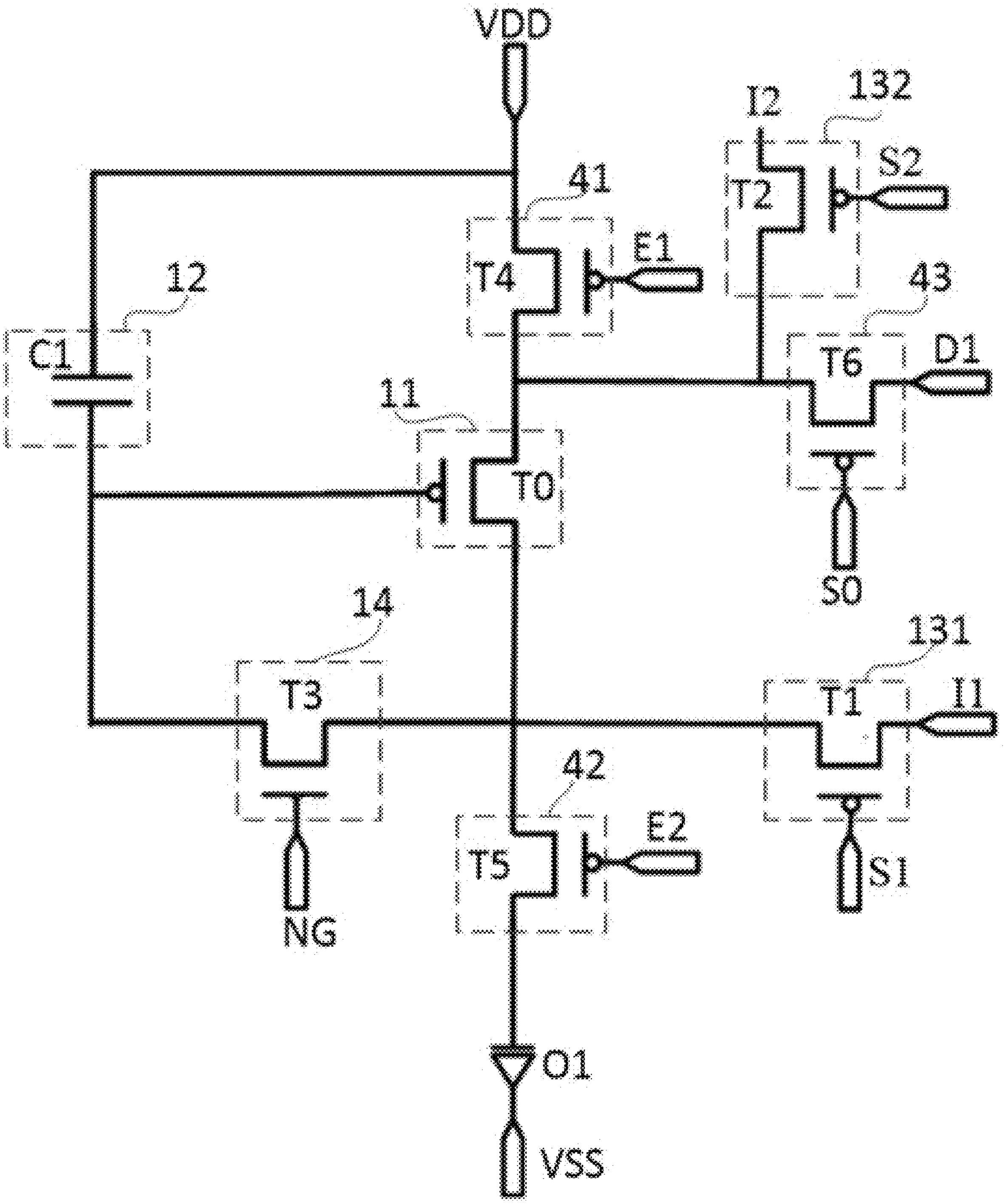
FIG. 17 is a circuit diagram of a pixel circuit according to at least one embodiment of the present disclosure.

As shown in FIG. 17, on the basis of at least one embodiment of the pixel circuit shown in FIG. 6, the first initialization sub-circuit 131 includes a first transistor T1; the second initialization sub-circuit 132 includes a second transistor T2, the driving circuit 11 includes a driving transistor T0; the light emitting element is an organic light emitting diode O1; the energy storage circuit 12 includes a storage capacitor C1;

The gate electrode of the first transistor T1 is electrically connected to the first initial control terminal S1, the source electrode of the first transistor T1 is electrically connected to the first initial voltage terminal I1, and the drain electrode of the first transistor T1 is electrically connected to the drain electrode of the driving transistor T0;

The gate electrode of the second transistor T2 is electrically connected to the second initial control terminal S2, the source electrode of the second transistor T2 is electrically connected to the second initial voltage terminal I2, and the drain electrode of the second transistor T2 is electrically connected to the source electrode of the driving transistor T0;

The compensation control circuit 14 includes a third transistor T3, the first light emitting control circuit 41 includes a fourth transistor T4, the second light emitting control circuit 42 includes a fifth transistor T5, and the data writing-in circuit 43 includes a sixth transistor T6;

The gate electrode of the third transistor T3 is electrically connected to the compensation control terminal NG, the source electrode of the third transistor T3 is electrically connected to the gate electrode of the driving transistor T0, and the drain electrode of the third transistor T3 is electrically connected to the drain electrode of the driving transistor T0;

The gate electrode of the fourth transistor T4 is electrically connected to the first light emitting control terminal E1, the source electrode of the fourth transistor T4 is electrically connected to the power supply voltage terminal VDD, and the drain electrode of the fourth transistor T4 is electrically connected to the source electrode of the driving transistor T0;

The gate electrode of the fifth transistor T5 is electrically connected to the second light emitting control terminal E2, the source electrode of the fifth transistor T5 is electrically connected to the drain electrode of the driving transistor T0, and the drain electrode of the fifth transistor T5 is electrically connected to the anode of the organic light emitting diode O1;

The gate electrode of the sixth transistor T6 is electrically connected to the writing-in control terminal S0, the source electrode of the sixth transistor T6 is electrically connected to the data line D1, and the drain electrode of the sixth transistor T6 is electrically connected to the source electrode of the driving transistor T0;

The cathode of the organic light emitting diode O1 is electrically connected to the low voltage terminal VSS;

A first terminal of the storage capacitor C1 is electrically connected to the gate electrode of the driving transistor T0, and a second terminal of the storage capacitor C1 is electrically connected to the power supply voltage terminal VDD.

On the basis of at least one embodiment of the pixel circuit shown in FIG. 17, T3 is an oxide thin film transistor, T1, T2, T4, T5, T6 and T0 are LTPS thin film transistors, T3 is an n-type transistor, T1, T2, T4, T5, T6 and T0 are p-type transistors, but not limited thereto.

Figure 18:
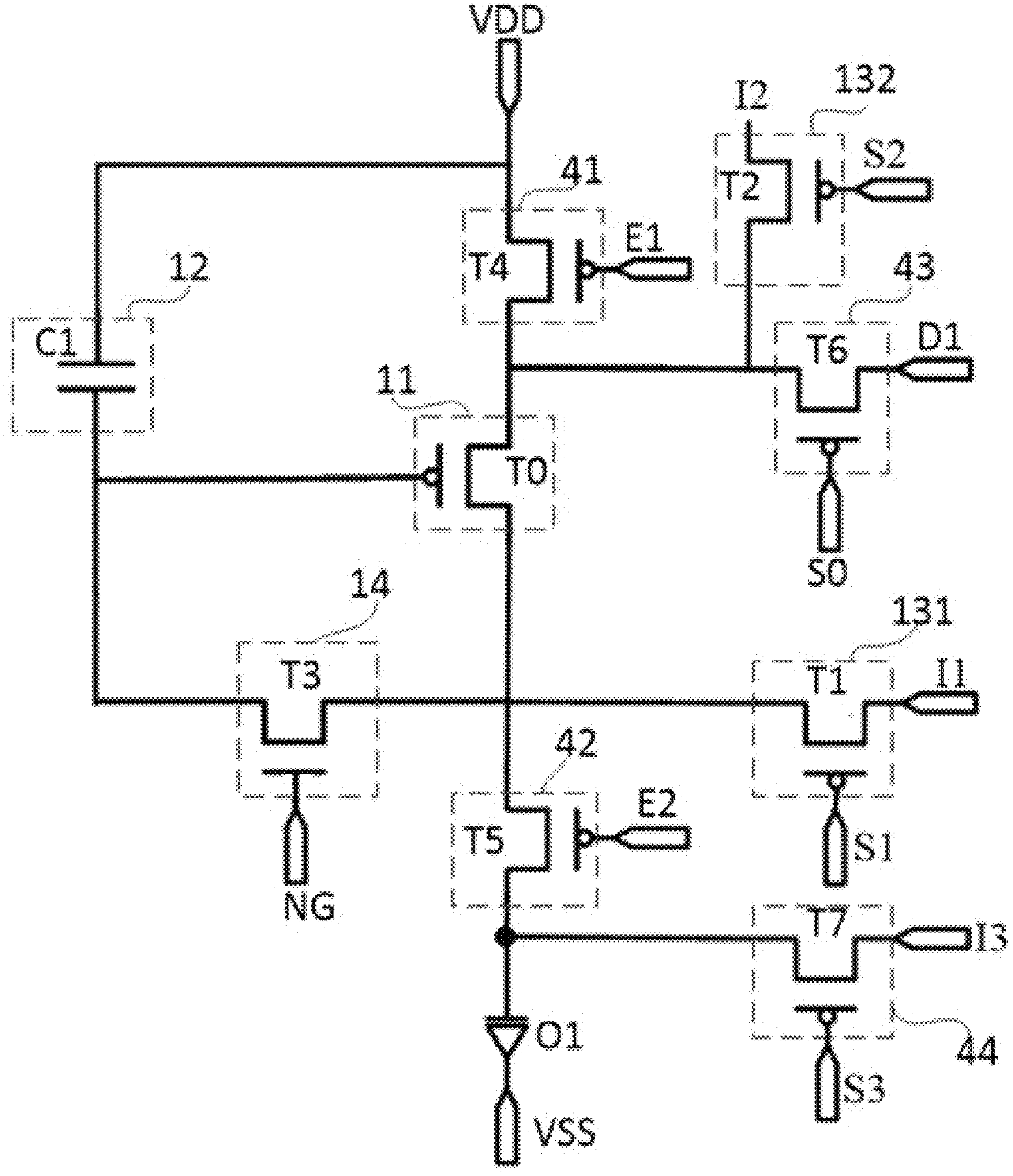
FIG. 18 is a circuit diagram of a pixel circuit according to at least one embodiment of the present disclosure.

As shown in FIG. 18, on the basis of at least one embodiment of the pixel circuit shown in FIG. 17, the reset circuit 44 includes a seventh transistor T7;

The gate electrode of the seventh transistor T7 is electrically connected to the reset control terminal S3, the source electrode of the seventh transistor T7 is electrically connected to the reset voltage terminal I3, and the drain electrode of the seventh transistor T7 is electrically connected to the anode of the light emitting diode O1.

On the basis of at least one embodiment of the pixel circuit shown in FIG. 18, T7 is an LTPS thin film transistor, and T7 is a p-type transistor, but not limited thereto.

Figure 19:
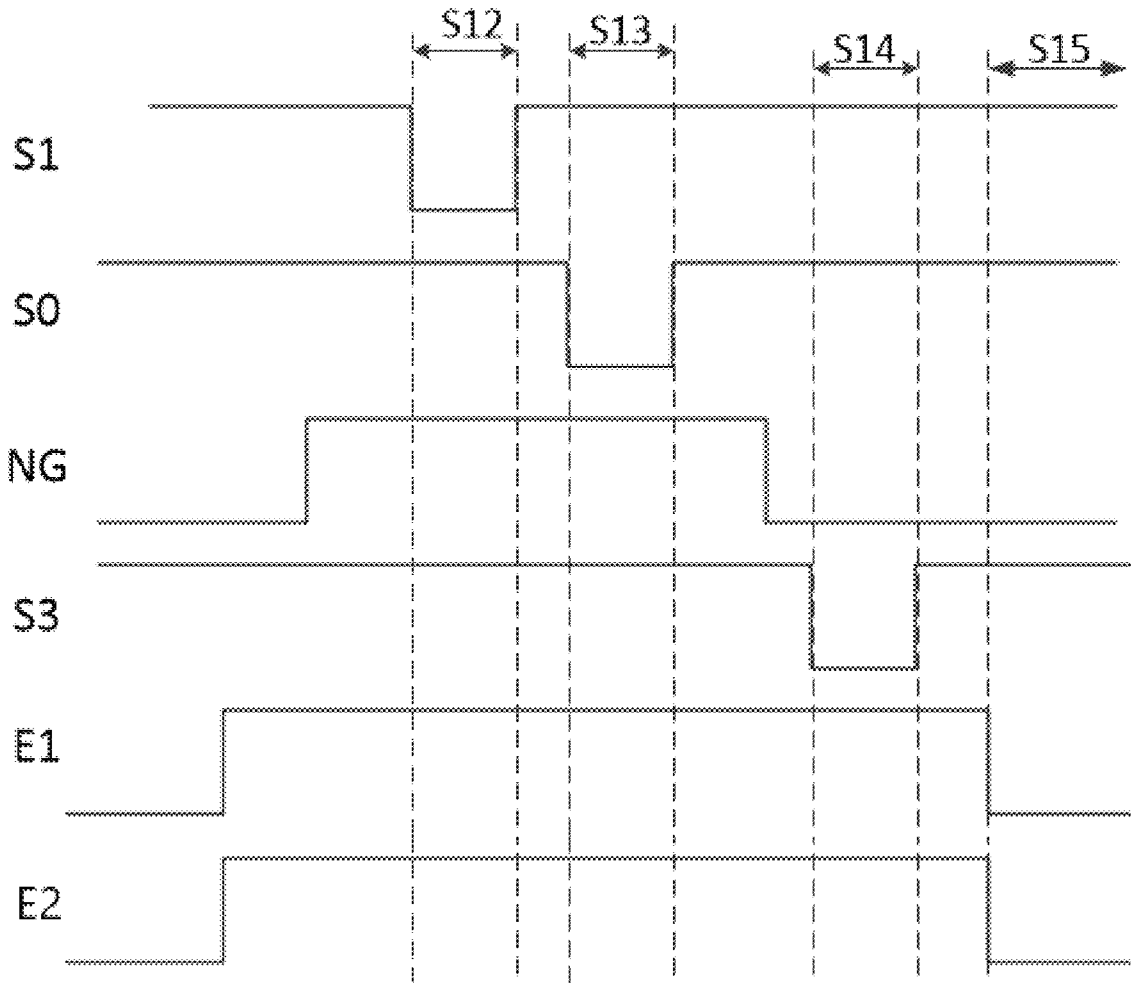
FIG. 19 is a working timing diagram of the pixel circuit shown in FIG. 18 of at least one embodiment of the present disclosure.
Figure 20A:
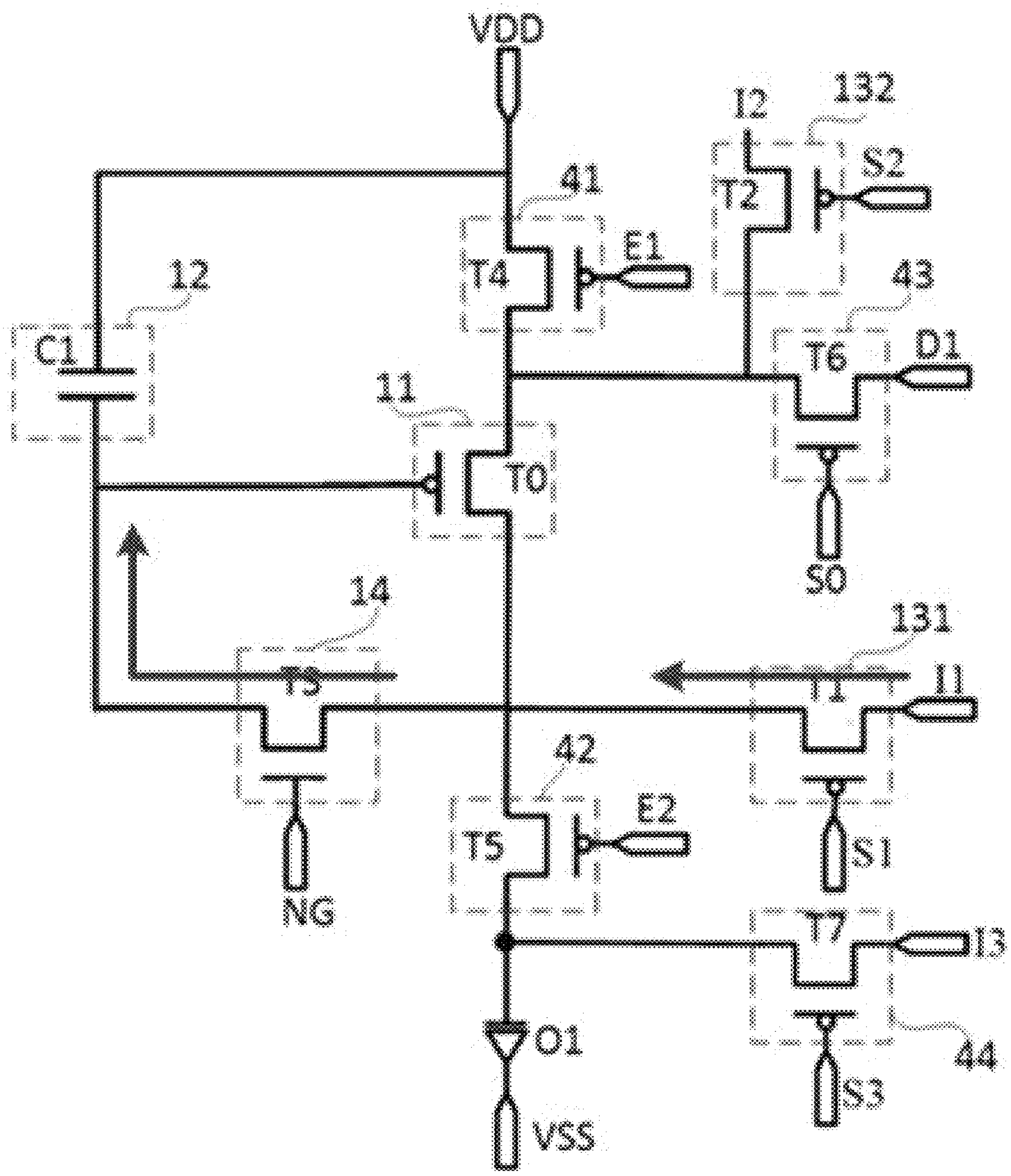
FIG. 20A is a schematic diagram of the working state of the pixel circuit shown in FIG. 18 in the first reset phase S12 of at least one embodiment of the present disclosure.
Figure 20B:
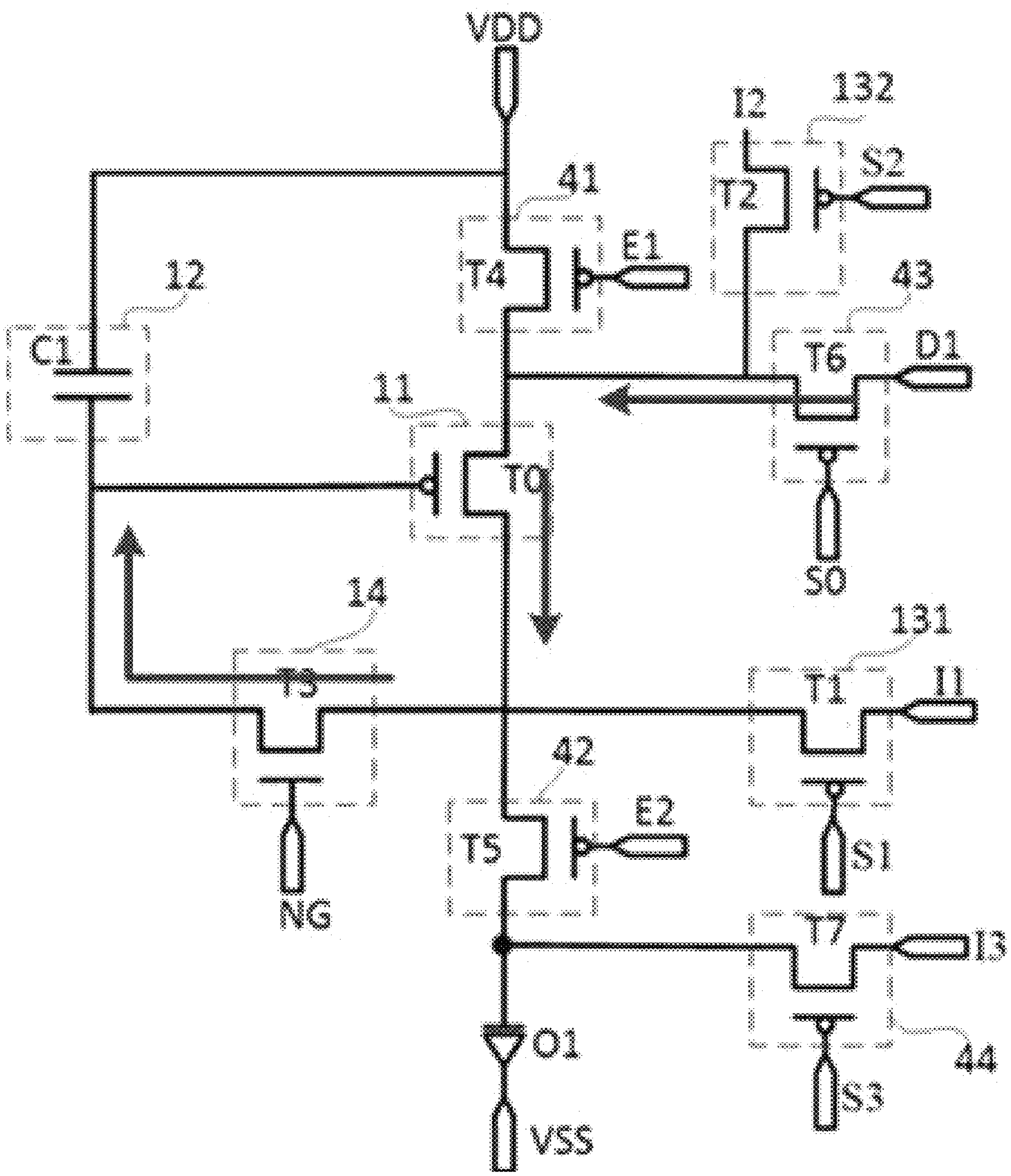
FIG. 20B is a schematic diagram of the working state of the pixel circuit shown in FIG. 18 in the first charging phase S13 of at least one embodiment of the present disclosure.
Figure 20C:
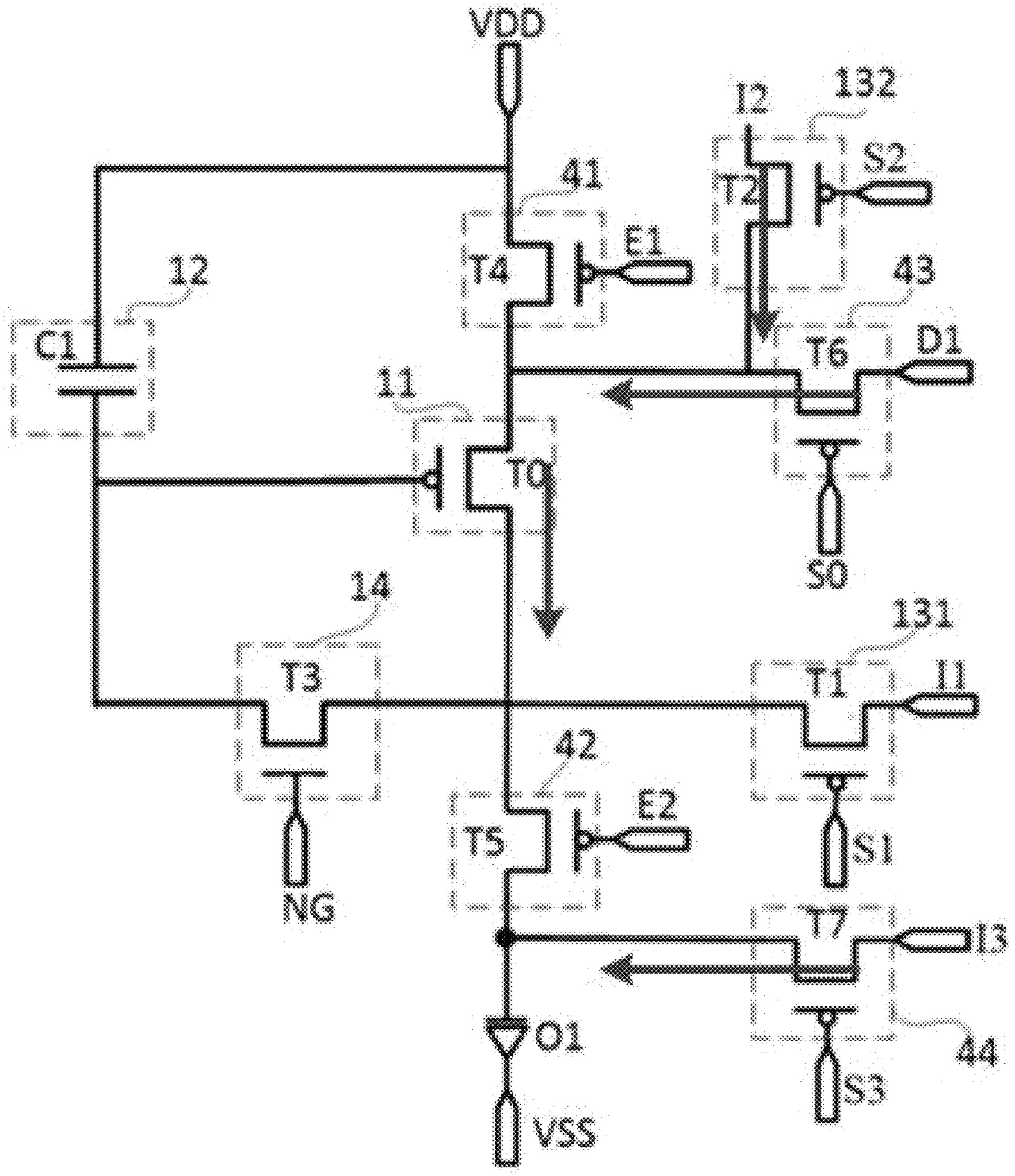
FIG. 20C is a schematic diagram of the working state of the pixel circuit shown in FIG. 18 in the first reset phase S14 of at least one embodiment of the present disclosure.
Figure 20D:
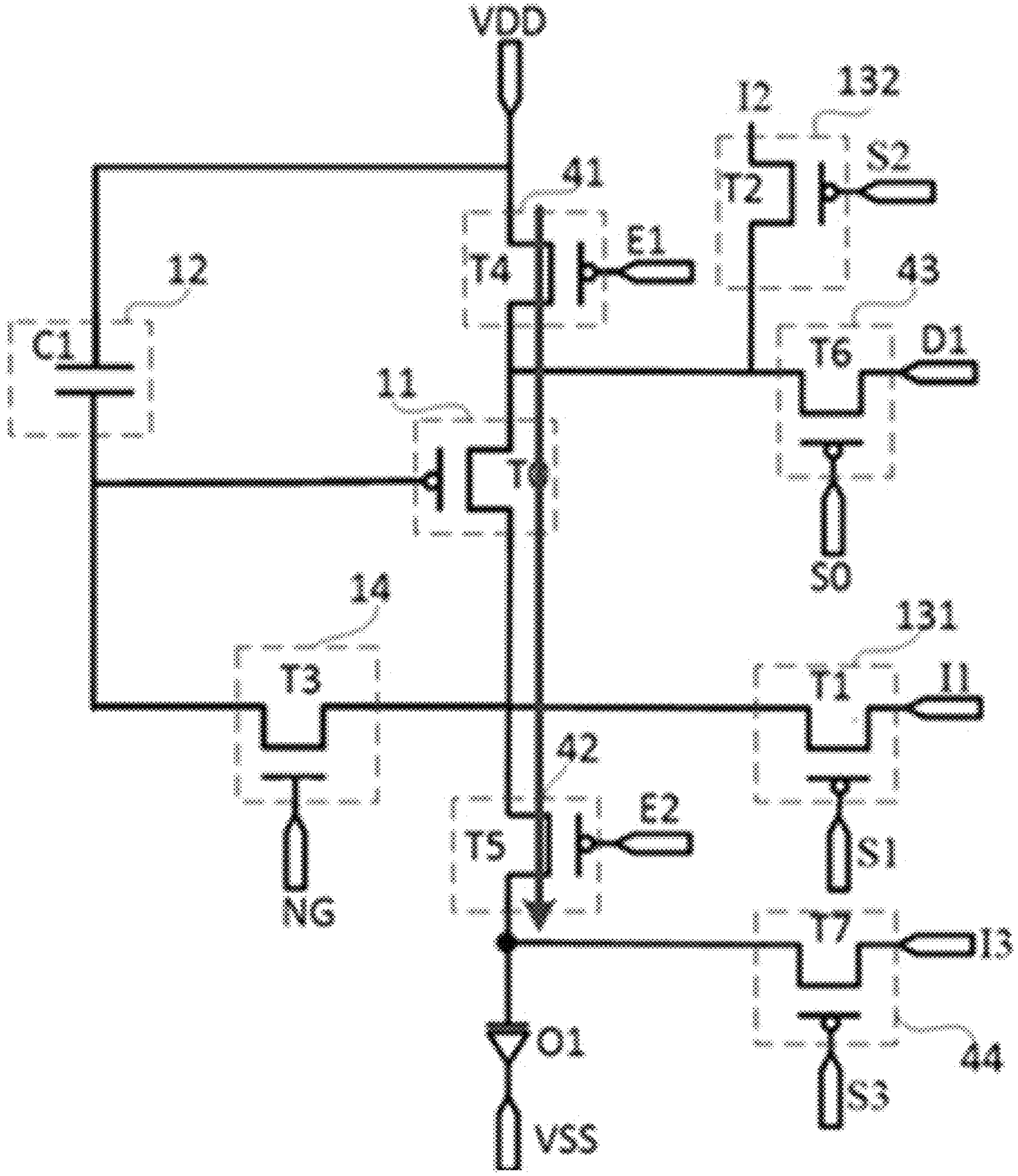
FIG. 20D is a schematic diagram of the working state of the pixel circuit shown in FIG. 18 in the first light emitting phase S15 of at least one embodiment of the present disclosure.

As shown in FIG. 19, when at least one embodiment of the pixel circuit shown in FIG. 18 of the present disclosure is working, the refresh frame includes the first reset phase S12, the first charging phase S13, the first reset phase S14 and a first light emitting phase S15 that are set successively;

In the first reset phase S12, S1 provides a low voltage signal, S0 provides a high voltage signal, NG provides a high voltage signal, S3 provides a high voltage signal, E1 and E2 provide a high voltage signal, and I1 provides the first initial voltage Vi1, as shown in FIG. 20A, T1 is turned on to write Vi1 into the drain electrode of T0, and T3 is turned on to write Vi1 into the gate electrode of T0, so that T0 can be turned on when the first charging phase S13 begins; the first initial voltage Vi1 is a negative voltage, for example, Vi1 can be a −3V voltage signal, but not limited thereto;

In the first charging phase S13, S1 provides a high voltage signal, S0 provides a low voltage signal, NG provides a high voltage signal, S3 provides a high voltage signal, E1 and E2 provide a high voltage signal, and D1 provides a data voltage Vdata, as shown in FIG. 20B, T6 is turned on, and T3 is turned on to write Vdata into the source electrode of T0;

At the beginning of the first charging phase S13, T0 is turned on, and Vdata charges C1 through T6, T0 and T3 until T0 is turned off. At this time, the gate voltage of T0 is Vdata+Vth, and Vth is the threshold voltage of T0;

In the first reset phase S14, S1 provides a high voltage signal, S0 provides a high voltage signal, NG provides a low voltage signal, S3 provides a low voltage signal, E1 and E2 provide a high voltage signal, as shown in FIG. 20C, T2 is turned on, and I2 provides a second initial voltage Vi2; Vi2 is a positive voltage; for example, Vi2 can be a 5V voltage signal; T0 is turned on to reset the drain voltage of T0 and the source voltage of T0 to Vi2, so that T0 is in a bias state, thereby improving the hysteresis; T7 is turned on, and I3 provides a reset voltage Vi3 to control O1 not to emit light and remove the residual charge on the anode of O1; Vi3 is a negative voltage, for example, Vi3 can be a −3V voltage signal;

In the first light emitting phase S15, S1 provides a high voltage signal, S0 provides a high voltage signal, NG provides a low voltage signal, S3 provides a high voltage signal, E1 and E2 provide a low voltage signal, as shown in FIG. 20D, T4 and T5 are turned on, T0 drives O1 to emit light.

During operation of at least one embodiment of the pixel circuit shown in FIG. 18 is in operation, Vi1 may be greater than and equal to −4V and less than −2V, Vi2 may be greater than 4V and less than 7V, Vi3 may be greater than −4V and less than −2V, but not limited to this.

Figure 21:
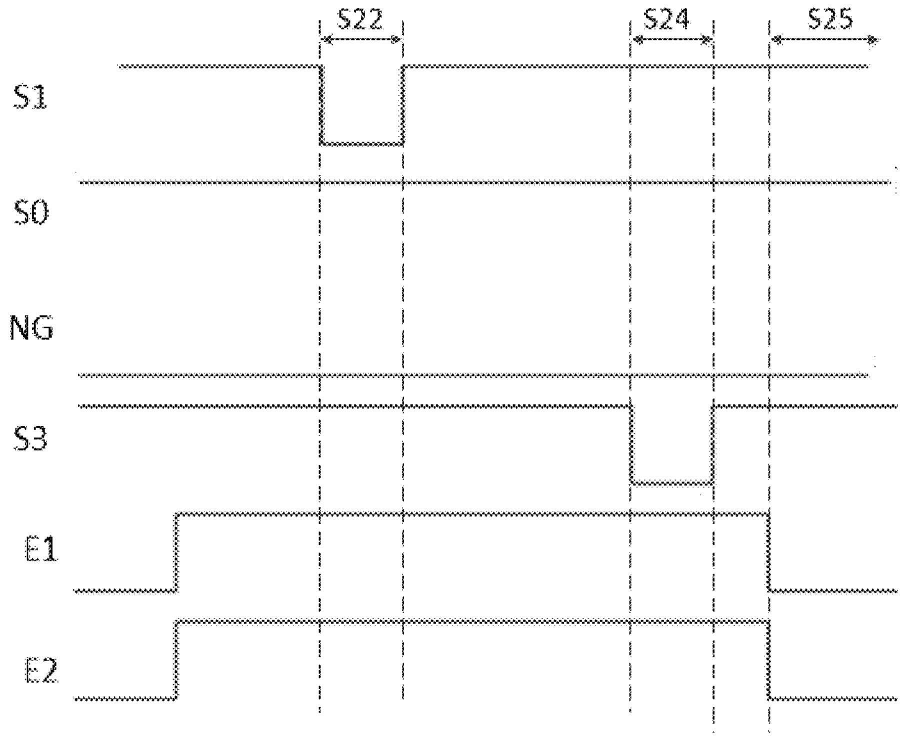
FIG. 21 is a working timing diagram of the pixel circuit shown in FIG. 18 of at least one embodiment of the present disclosure.

As shown in FIG. 21, when at least one embodiment of the pixel circuit shown in FIG. 18 of the present disclosure is in operation, the retention frame includes the second reset phase S22, the second set phase S24 and the second light emitting phase S25 that are arranged successively.

In the retention frame, NG provides a low voltage signal, T3 is turned off, and the gate electrode of T0 is controlled to be disconnected from the drain electrode of T0 to maintain the gate voltage of T0;

In the retention frame, S0 provides a high voltage signal, T6 is turned off, and stops writing the voltage signal provided by D1 to the source electrode of T0;

In the second reset phase S22, S1 provides a low voltage signal, S0 provides a high voltage signal, S3 provides a high voltage signal, E1 and E2 provide a high voltage signal, I1 provides the first initial voltage Vi1, and T1 is turned on to write Vi1 into T0 the drain;

In the second reset phase S24, S1 provides a high voltage signal, S0 provides a high voltage signal, S3 provides a low voltage signal, E1 and E2 provide a high voltage signal, T2 is turned on, and I2 provides a second initial voltage Vi2; Vi2 is a positive voltage; for example, Vi2 can be a 5V voltage signal; T0 is turned on to reset the drain voltage of T0 and the source voltage of T0 to Vi2, so that T0 is in a bias state to improve hysteresis; T7 is turned on, and I3 provides a reset voltage Vi3, to control O1 not to emit light, and remove the residual charge on the anode of O1; Vi3 is a negative voltage, for example, Vi3 can be a −3V voltage signal;

In the second light emitting phase S25, S1 provides a high voltage signal, S0 provides a high voltage signal, S3 provides a high voltage signal, E1 and E2 provide a low voltage signal, T4 and T5 are turned on, and T0 drives O1 to emit light.

Figure 22:
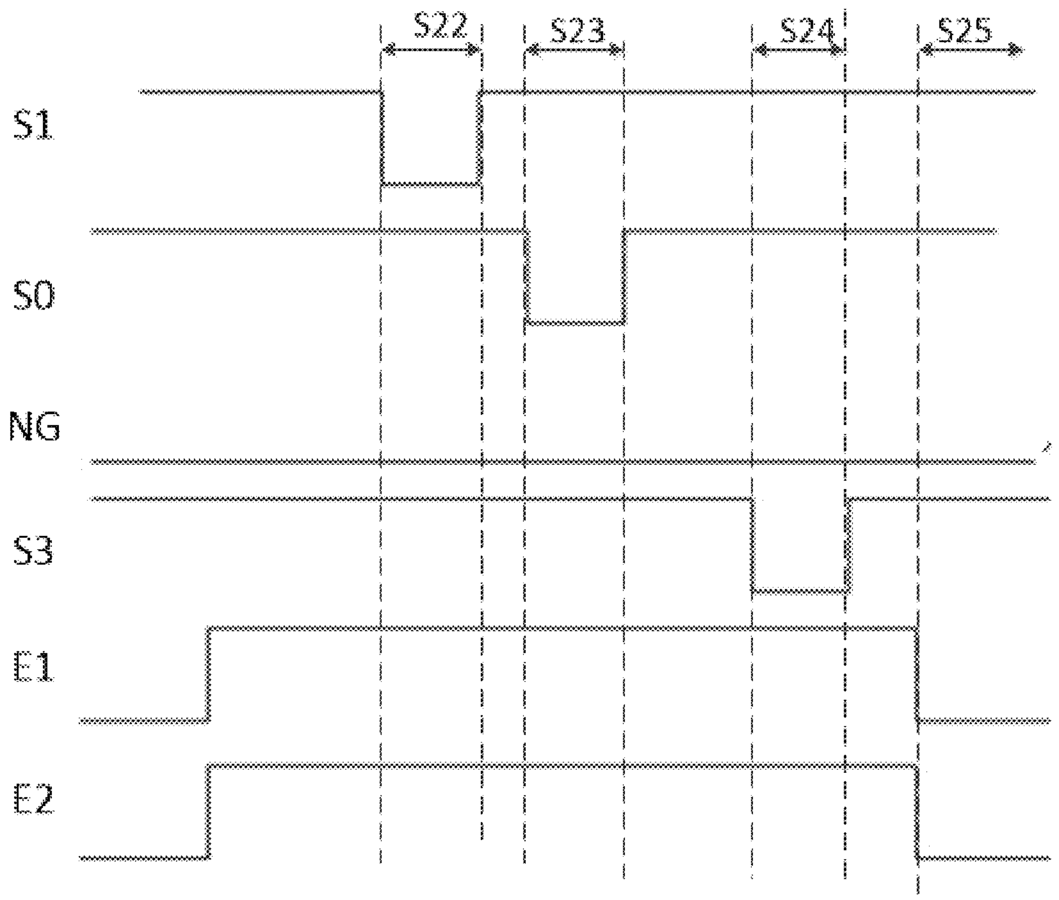
FIG. 22 is a working timing diagram of the pixel circuit shown in FIG. 18 of at least one embodiment of the present disclosure.

As shown in FIG. 22, when at least one embodiment of the pixel circuit shown in FIG. 18 of the present disclosure is in operation, the retention frame includes the second reset phase S22, the retention set phase S23, and the second set phase S24 and a second light emitting phase S25 that are set successively;

In the retention frame, NG provides a low voltage signal, T3 is turned off, and the gate electrode of T0 is controlled to be disconnected from the drain electrode of T0 to maintain the gate voltage of T0;

In the second reset phase S22, S1 provides a low voltage signal, S0 provides a high voltage signal, S3 provides a high voltage signal, E1 and E2 provide a high voltage signal, I1 provides the first initial voltage Vi1, and T1 is turned on to write Vi1 into the drain electrode of T0;

In the retention set phase S23, S1 provides a high voltage signal, S0 provides a low voltage signal, S3 provides a high voltage signal, E1 and E2 provide a high voltage signal, T6 is turned on, D1 provides a voltage signal, and the voltage signal provided by D1 is written into source electrode of T0.

In the retention set phase S23, the voltage signal provided by D1 can be a positive voltage to set the source voltage of T0, thereby providing a bias voltage to the driving transistor T0, so that T0 is in a bias state to improve the hysteresis;

In the second reset phase S24, S1 provides a high voltage signal, S0 provides a high voltage signal, S3 provides a low voltage signal, E1 and E2 provide a high voltage signal, T2 is turned on, and I2 provides a second initial voltage Vi2; Vi2 is a positive voltage; for example, Vi2 can be a 5V voltage signal; T0 is turned on to reset the drain voltage of T0 and the source voltage of T0 to Vi2, so that T0 is in a bias state to improve hysteresis; T7 is turned on, and I3 provides a reset voltage Vi3, to control O1 not to emit light, and remove the residual charge on the anode of O1; Vi3 is a negative voltage, for example, Vi3 can be a −3V voltage signal;

In the second light emitting phase S25, S1 provides a high voltage signal, S0 provides a high voltage signal, S3 provides a high voltage signal, E1 and E2 provide a low voltage signal, T4 and T5 are turned on, and T0 drives O1 to emit light.

In a specific implementation, in the retention reset phase, the voltage signal provided by the data line D1 may be a data voltage Vdata, and the data voltage Vdata is the data voltage provided by the data line D1 in the first charging phase, the voltage value range of the data voltage Vdata may be, for example, greater than or equal to 1V and less than or equal to 6.5V; or, In the retention reset phase, the voltage signal provided by the data line D1 may be a reset voltage signal, and the voltage value range of the reset voltage signal may be greater than or equal to 4.6V and less than or equal to 7V; but not limited to this.

At least one embodiment of the pixel circuit shown in FIG. 17 of the present disclosure is in operation, when displaying at a low frequency, the display period includes a refresh frame and a retention frame. In the second reset phase in the retention frame, the driving transistor included in the driving circuit is biased so that in the reset phase in the retention frame, the potential of the source electrode of the driving transistor in the driving circuit and the potential of the drain electrode of the driving transistor are consistent with the refresh frame, which can improve the flicker.

The driving method described in the embodiment of the present disclosure is applied to the above-mentioned pixel circuit, and the display period of the pixel circuit includes a refresh frame and a retention frame; the driving method includes:

In the refresh frame and the retention frame, at least in the set phase, controlling, by the initialization circuit, to provide the initial voltage provided by the initial voltage terminal to the first terminal of the driving circuit and/or the second terminal of the driving circuit under the control of the initial control signal provide by the initial control terminal.

In the driving method described in the embodiment of the present disclosure, under the control of the initial control signal, in the refresh frame and the retention frame, at least in the set phase, the initialization circuit controls to provide the initial voltage provided by the initial voltage terminal to the first terminal of the driving circuit and/or the second terminal of the driving circuit, to provide a bias voltage to the driving transistor included in the driving circuit, so that the driving transistor included in the driving circuit is in a bias state to improve the hysteresis and enhance the display effect.

Optionally, the initialization circuit includes a first initialization sub-circuit; the pixel circuit further includes a first light emitting control circuit, a second light emitting control circuit, a data writing-in circuit and a reset circuit; the refresh frame includes a first initialization phase, a first reset phase, a first charging phase, a first set phase, and a first light emitting phase; the driving method described in at least one embodiment of the present disclosure includes:

In the first initialization phase, the first initialization sub-circuit writing the first initial voltage provided by the first initial voltage terminal into the second terminal of the driving circuit under the control of the first initial control signal; the compensation control circuit controlling to connect the control terminal of the driving circuit and the second terminal of the driving circuit under the control of the compensation control signal;

In the first reset phase, under the control of the reset control signal, the reset circuit writing the reset voltage provided by the reset voltage terminal into the first electrode of the light emitting element, and the second light emitting control circuit controlling to connect the second terminal of the driving circuit and the first electrode of the light emitting element under the control of the second light emitting control signal; the compensation control circuit controlling to connect the control terminal of the driving circuit and the second terminal of the driving circuit under the control of the compensation control signal;

In the first charging phase, the data writing-in circuit writing the data voltage provided by the data line into the first terminal of the driving circuit, and the compensation control circuit controlling to connect the control terminal and the second terminal of the driving circuit under the control of the compensation control signal;

In the first set phase, the first initialization sub-circuit writing the first initial voltage provided by the first initial voltage terminal into the second terminal of the driving circuit under the control of the first initial control signal; the driving circuit controlling to connect the first terminal of the driving circuit and the second terminal of the driving circuit under the control of the potential of the control terminal of the driving circuit, so as to control the driving transistor included in the driving circuit to be in a bias state;

In the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

In at least one embodiment of the present disclosure, the initialization circuit includes a first initialization sub-circuit; the pixel circuit further includes a first light emitting control circuit, a second light emitting control circuit, a data writing-in circuit and a reset circuit; the retention frame includes a second initialization phase, a second reset phase, a second set phase and a second light emitting phase set successively; the driving method includes:

In the retention frame, the compensation control circuit controlling to disconnect the control terminal of the driving circuit from the second terminal of the driving circuit under the control of the compensation control signal;

In the second initialization phase, the first initialization sub-circuit writing the first initial voltage provided by the first initial voltage terminal into the second terminal of the driving circuit under the control of the first initial control signal;

In the second reset phase, the reset circuit writing the reset voltage provided by the reset voltage terminal into the first electrode of the light emitting element under the control of the reset control signal, and the second light emitting control circuit controlling to connect the second terminal of the driving circuit and the first electrode of the light emitting element under the control of the second light emitting control signal;

In the second set phase, the first initialization sub-circuit writing the first initial voltage provided by the first initial voltage terminal into the second terminal of the driving circuit under the control of the first initial control signal; the driving circuit controlling to connect the first terminal of the driving circuit and the second terminal of the driving circuit under the control of the potential of the control terminal of the driving circuit, so as to control the driving transistor included in the driving circuit to be in a bias state;

In the second light emitting phase, the first light emitting control circuit controlling to connect the power supply voltage terminal and the first terminal of the driving circuit under the control of the first light emitting control signal; controlling to connect the second terminal of the driving circuit and the first electrode of the light emitting element under the control of the second light emitting control signal; the driving circuit driving the light emitting element to emit light under the control of the potential of the control terminal of the driving circuit.

In at least one embodiment of the present disclosure, the retention frame further includes a retention set phase set between the second reset phase and the second set phase; the driving method further includes:

In the retention set phase, the data writing-in circuit writing the voltage signal provided by the data line into the first terminal of the driving circuit.

Optionally, the initialization circuit includes a second initialization sub-circuit; the pixel circuit further includes a first light emitting control circuit, a second light emitting control circuit, a data writing-in circuit and a reset circuit; the refresh frame includes a first initialization phase, a first reset phase, a first charging phase, a first set phase, and a first light emitting phase; the driving method described in at least one embodiment of the present disclosure includes:

In the first initialization phase, the second initialization sub-circuit writing the second initial voltage provided by the second initial voltage terminal into the first terminal of the driving circuit under the control of the second initial control signal; the compensation control circuit controlling to connect the control terminal of the driving circuit and the second terminal of the driving circuit under the control of the compensation control signal;

In the first reset phase, under the control of the reset control signal, the reset circuit writing the reset voltage provided by the reset voltage terminal into the first electrode of the light emitting element; the second light emitting control circuit controlling to connect the second terminal of the driving circuit and the first electrode of the light emitting element under the control of the second light emitting control signal; the compensation control circuit controlling to connect the control terminal of the driving circuit and the second terminal of the driving circuit under the control of the compensation control signal;

In the first charging phase, the data writing-in circuit writing the data voltage provided by the data line into the first terminal of the driving circuit, and the compensation control circuit controlling to connect the control terminal of the driving circuit and the second terminal of the driving circuit under the control of the compensation control signal;

In the first set phase, the second initialization sub-circuit writing the second initial voltage provided by the second initial voltage terminal into the first terminal of the driving circuit under the control of the second initial control signal; the driving circuit controlling to connect the first terminal of the driving circuit and the second terminal of the driving circuit under the control of the potential of the control terminal of the driving circuit, so as to control the driving transistor included in the driving circuit to be in a bias state;

In the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

In at least one embodiment of the present disclosure, the initialization circuit includes a second initialization sub-circuit; the pixel circuit further includes a first light emitting control circuit, a second light emitting control circuit, a data writing-in circuit and a reset circuit; the retention frame includes the second initialization phase, the second reset phase, the second set phase and the second light emitting phase set successively; the driving method includes:

In the retention frame, the compensation control circuit controlling to disconnect the control terminal of the driving circuit from the second terminal of the driving circuit under the control of the compensation control signal;

In the second initialization phase, the second initialization sub-circuit writing a second initial voltage provided by the second initial voltage terminal into the first terminal of the driving circuit under the control of the second initial control signal;

In the second reset phase, the reset circuit writing the reset voltage provided by the reset voltage terminal into the first electrode of the light emitting element under the control of the reset control signal; the second light emitting control circuit controlling to connect the second terminal of the driving circuit and the first electrode of the light emitting element under the control of the second light emitting control signal;

In the second reset phase, the second initialization sub-circuit writing the second initial voltage provided by the second initial voltage terminal into the first terminal of the driving circuit under the control of the second initial control signal; the driving circuit controlling to connect the first terminal of the driving circuit and the second terminal of the driving circuit under the control of the potential of the control terminal of the driving circuit, so as to control the driving transistor included in the driving circuit to be in a bias state;

In the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

In at least one embodiment of the present disclosure, the retention frame further includes a retention set phase set between the second reset phase and the second set phase; the driving method further includes:

In the retention set phase, the data writing-in circuit writing the voltage signal provided by the data line into the first terminal of the driving circuit.

Optionally, the initialization circuit includes a first initialization sub-circuit and a second initialization sub-circuit; the pixel circuit further includes a first light emitting control circuit, a second light emitting control circuit and a data writing-in circuit; the refresh frame includes the first reset phase, the first charging phase, the first set phase, and the first light emitting phase that are set successively; the driving method described in at least one embodiment of the present disclosure includes:

In the first reset phase, the first initialization sub-circuit writing the first initial voltage provided by the first initial voltage terminal into the second terminal of the driving circuit under the control of the first initial control signal, and the compensation control circuit controlling to connect the control terminal of the driving circuit and the second terminal of the driving circuit under the control of the compensation control signal;

In the first charging phase, the data writing-in circuit writing the data voltage provided by the data line into the first terminal of the driving circuit, and the compensation control circuit controlling to connect the control terminal and the second terminal of the driving circuit under the control of the compensation control signal;

In the first set phase, the second initialization sub-circuit writing the second initial voltage provided by the second initial voltage terminal into the first terminal of the driving circuit under the control of the second initial control signal, the driving circuit controlling to connect the first terminal of the driving circuit and the second terminal of the driving circuit under the control of the potential of the control terminal of the driving circuit, so as to control the driving transistor included in the driving circuit to be in a bias state;

In the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

In at least one embodiment of the present disclosure, the pixel circuit further includes a reset circuit; the driving method further includes:

In the first reset phase, the reset circuit writing the reset voltage provided by the reset voltage terminal into the first electrode of the light emitting element under the control of the reset control signal.

Optionally, the initialization circuit includes a first initialization sub-circuit and a second initialization sub-circuit; the pixel circuit also includes a first light emitting control circuit, a second light emitting control circuit and a data writing-in circuit; the retention frame includes the second initialization phase, the second reset phase, the second set phase, and the second light emitting phase that are set successively; the driving method described in at least one embodiment of the present disclosure includes:

In the retention frame, the compensation control circuit controlling to disconnect the control terminal of the driving circuit from the second terminal of the driving circuit under the control of the compensation control signal;

In the second reset phase, the first initialization sub-circuit writing the first initial voltage provided by the first initial voltage terminal into the second terminal of the driving circuit under the control of the first initial control signal;

In the second set phase, the second initialization sub-circuit writing the second initial voltage provided by the second initial voltage terminal into the first terminal of the driving circuit under the control of the second initial control signal, the driving circuit controlling to connect the first terminal of the driving circuit and the second terminal of the driving circuit under the control of the potential of the control terminal of the driving circuit, so as to control the driving transistor included in the driving circuit to be in a bias state;

In the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

Optionally, the pixel circuit further includes a reset circuit; the driving method described in at least one embodiment of the present disclosure further includes:

In the second set phase, the reset circuit writing the reset voltage provided by the reset voltage terminal into the first electrode of the light emitting element under the control of the reset control signal.

In at least one embodiment of the present disclosure, the retention frame further includes a retention set phase set between the second reset phase and the second set phase; the driving method further includes:

In the retention set phase, the data writing-in circuit writing the voltage signal provided by the data line into the first terminal of the driving circuit.

The display device described in the embodiment of the present disclosure includes the above-mentioned pixel circuit.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a light emitting element, a driving circuit, an energy storage circuit, an initialization circuit, and a compensation control circuit; wherein a display period of the pixel circuit includes a refresh frame and a retention frame; the refresh frame and the retention frame each include a set phase and a light emitting phase set successively;

the compensation control circuit is electrically connected to a compensation control terminal, a control terminal of the driving circuit, and a second terminal of the driving circuit, respectively, is configured to control to connect the control terminal of the driving circuit and the second terminal of the driving circuit under the control of a compensation control signal provided by the compensation control terminal;

the initialization circuit is respectively electrically connected to an initial control terminal and an initial voltage terminal, and the initialization circuit is electrically connected to a first terminal of the driving circuit, is configured to control provide an initial voltage provided by the initial voltage terminal to the first terminal and/or the second terminal of the driving circuit in the refresh frame and the retention frame, at least in the set phase under the control of an initial control signal provided by the initial control terminal at least in the set phase;

the second terminal of the driving circuit is electrically connected to the light emitting element, and is configured to drive the light emitting element under the control of a potential of the control terminal of the driving circuit;

wherein the initialization circuit includes a second initialization sub-circuit; the initial control terminal includes a second initial control terminal, and the initial voltage terminal includes a second initial voltage terminal;

the second initialization sub-circuit is electrically connected to the second initial control terminal, the second initial voltage terminal and the first terminal of the driving circuit, respectively, is configured to write a second initial voltage provided by the second initial voltage terminal into the first terminal of the driving circuit in the refresh frame and the retention frame, at least in the set phase under the control of a second initial control signal provided by the second initial control terminal.

2. The pixel circuit according to claim 1, wherein the initialization circuit includes a second initialization sub-circuit, the second initialization sub-circuit includes a second transistor, the compensation control circuit includes a third transistor, the pixel circuit further includes a first light emitting control circuit, a second light emitting control circuit, a data writing-in circuit and a reset circuit, the first light emitting control circuit includes a fourth transistor, the second light emitting control circuit includes a fifth transistor, the data writing-in circuit includes a sixth transistor, and the reset circuit includes a seventh transistor;

the third transistor is an n-type transistor, and the second transistor, the third transistor, the fourth transistor, the fifth transistor, the sixth transistor, the seventh transistor and a driving transistor included in the driving circuit are p-type transistors.

3. The pixel circuit according to claim 1, wherein during the set phase in the retention frame, a potential of a source electrode of a driving transistor included in the driving circuit is consistent with the refresh frame.

4. The pixel circuit according to claim 1, wherein during the set phase in the retention frame, a potential of a drain electrode of a driving transistor included in the driving circuit is consistent with the refresh frame.

5. The pixel circuit according to claim 1, wherein the second initialization sub-circuit comprises a second transistor;

a control electrode of the second transistor is electrically connected to the second initial control terminal, a first electrode of the second transistor is electrically connected to the second initial voltage terminal, and a second electrode of the second transistor is electrically connected to the first terminal of the driving circuit.

6. The pixel circuit according to claim 1, further comprising a first light emitting control circuit, a second light emitting control circuit and a data writing-in circuit; wherein the first light emitting control circuit is electrically connected to a first light emitting control terminal, a power supply voltage terminal and the first terminal of the driving circuit respectively, and is configured to control to connect the power supply voltage terminal and the first terminal of the driving circuit under the control of a first light emitting control signal provided by the first light emitting control terminal;

the second light emitting control circuit is electrically connected to a second light emitting control terminal, the second terminal of the driving circuit and the first electrode of the light emitting element respectively, and is configured to control to connect the second terminal of the driving circuit and the first electrode of the light emitting element under the control of a second light emitting control signal provided by the second light emitting control terminal.

7. The pixel circuit according to claim 6, wherein the data writing-in circuit is respectively electrically connected to a writing-in control terminal, a data line and the first terminal of the driving circuit, and is configured to control to connect the data line and the first terminal of the driving circuit under the control of a data writing-in control signal provided by the writing-in control terminal.

8. The pixel circuit according to claim 6, further comprising a reset circuit; wherein the reset circuit is respectively electrically connected to a reset control terminal, a reset voltage terminal and the first electrode of the light emitting element, and is configured to control to write a reset voltage provided by the reset voltage terminal into the first electrode of the light emitting element under the control of a reset control signal provided by the reset control terminal.

9. The pixel circuit according to claim 6, wherein the compensation control circuit includes a third transistor, the first light emitting control circuit includes a fourth transistor, the second light emitting control circuit includes a fifth transistor, and the data writing-in circuit includes a sixth transistor, the driving circuit includes a driving transistor;

a control electrode of the third transistor is electrically connected to the compensation control terminal, a first electrode of the third transistor is electrically connected to the control terminal of the driving circuit, and a second electrode of the third transistor is electrically connected to the second terminal of the driving circuit;

a control electrode of the fourth transistor is electrically connected to the first light emitting control terminal, a first electrode of the fourth transistor is electrically connected to the power supply voltage terminal, and a second electrode of the fourth transistor is electrically connected to the first terminal of the driving circuit;

a control electrode of the fifth transistor is electrically connected to the second light emitting control terminal, a first electrode of the fifth transistor is electrically connected to the second terminal of the driving circuit, and a second electrode of the fifth transistor is electrically connected to the first electrode of the light emitting element;

a control electrode of the sixth transistor is electrically connected to the writing-in control terminal, a first electrode of the sixth transistor is electrically connected to the data line, and a second electrode of the sixth transistor is electrically connected to the first terminal of the driving circuit;

a control electrode of the driving transistor is electrically connected to the control terminal of the driving circuit, a first electrode of the driving transistor is electrically connected to the first terminal of the driving circuit, and a second electrode of the driving transistor is electrically connected to the second terminal of the driving circuit.

10. The pixel circuit according to claim 8, wherein the reset circuit comprises a seventh transistor;

a control electrode of the seventh transistor is electrically connected to the reset control terminal, a first electrode of the seventh transistor is electrically connected to the reset voltage terminal, and a second electrode of the seventh transistor is connected to the first electrode of the light emitting element.

11. The pixel circuit according to claim 8, wherein the second initial voltage is a positive voltage, and the reset voltage is a negative voltage.

12. The pixel circuit according to claim 11, wherein the second initial voltage is greater than 4V and less than 7V, and the reset voltage is greater than −4V and less than −2V.

13. The pixel circuit according to claim 12, wherein the second initial voltage is a 5V voltage signal and the reset voltage is a −3V voltage signal.

14. The pixel circuit according to claim 1, wherein the refresh frame includes a first initialization phase, a first charging phase, and a first light emitting phase set successively;

the retention frame includes a second initialization phase, a second set phase and a second light emitting phase set successively.

15. The pixel circuit according to claim 1, wherein in the retention frame, the compensation control circuit controlling to disconnect the control terminal of the driving circuit from the second terminal of the driving circuit under the control of the compensation control signal.

16. A driving method, applied to a pixel circuit, wherein a display period of the pixel circuit includes a refresh frame and a retention frame; the refresh frame and the retention frame each includes a set phase and a light emitting phase set successively; the pixel circuit includes a light emitting element, a driving circuit, an energy storage circuit, an initialization circuit, and a compensation control circuit;

the compensation control circuit is electrically connected to a compensation control terminal, a control terminal of the driving circuit, and a second terminal of the driving circuit, respectively, is configured to control to connect the control terminal of the driving circuit and the second terminal of the driving circuit under the control of a compensation control signal provided by the compensation control terminal;

the initialization circuit is respectively electrically connected to an initial control terminal and an initial voltage terminal, and the initialization circuit is electrically connected to a first terminal of the driving circuit;

the second terminal of the driving circuit is electrically connected to the light emitting element, and is configured to drive the light emitting element under the control of a potential of the control terminal of the driving circuit;

wherein the initialization circuit includes a second initialization sub-circuit; the initial control terminal includes a second initial control terminal, and the initial voltage terminal includes a second initial voltage terminal;

the second initialization sub-circuit is electrically connected to the second initial control terminal, the second initial voltage terminal and the first terminal of the driving circuit, respectively, is configured to write a second initial voltage provided by the second initial voltage terminal into the first terminal of the driving circuit in the refresh frame and the retention frame, at least in the set phase under the control of a second initial control signal provided by the second initial control terminal; and the driving method includes:

in the refresh frame and the retention frame, at least in the set phase, controlling, by the initialization circuit, to provide the initial voltage provided by the initial voltage terminal to the first terminal of the driving circuit and/or the second terminal of the driving circuit under the control of the initial control signal provide by the initial control terminal.

17. The driving method according to claim 16, wherein the initialization circuit includes a second initialization sub-circuit; the pixel circuit further includes a first light emitting control circuit, a second light emitting control circuit, a data writing-in circuit and a reset circuit; the refresh frame includes a first initialization phase, a first charging phase, and a first light emitting phase set successively; the driving method includes:

in the first initialization phase, the second initialization sub-circuit writing the second initial voltage provided by the second initial voltage terminal into the first terminal of the driving circuit under the control of the second initial control signal; the compensation control circuit controlling to connect the control terminal of the driving circuit and the second terminal of the driving circuit under the control of the compensation control signal;

in the first charging phase, the data writing-in circuit writing the data voltage provided by the data line into the first terminal of the driving circuit, and the compensation control circuit controlling to connect the control terminal of the driving circuit and the second terminal of the driving circuit under the control of the compensation control signal;

in the first light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

18. The driving method according to claim 16, wherein the initialization circuit includes a second initialization sub-circuit; the pixel circuit further includes a first light emitting control circuit, a second light emitting control circuit, a data writing-in circuit and a reset circuit; the retention frame includes a second initialization phase, a second set phase and a second light emitting phase set successively; the driving method includes:

in the retention frame, the compensation control circuit controlling to disconnect the control terminal of the driving circuit from the second terminal of the driving circuit under the control of the compensation control signal;

in the second initialization phase, the second initialization sub-circuit writing a second initial voltage provided by the second initial voltage terminal into the first terminal of the driving circuit under the control of the second initial control signal;

in the second set phase, the second initialization sub-circuit writing the second initial voltage provided by the second initial voltage terminal into the first terminal of the driving circuit under the control of the second initial control signal; the driving circuit controlling to connect the first terminal of the driving circuit and the second terminal of the driving circuit under the control of the potential of the control terminal of the driving circuit;

in the second light emitting phase, the first light emitting control circuit controlling to connect the power supply voltage terminal and the first terminal of the driving circuit under the control of the first light emitting control signal; the second light emitting control circuit controlling to connect the second terminal of the driving circuit and the first electrode of the light emitting element under the control of the second light emitting control signal; the driving circuit driving the light emitting element to emit light under the control of the potential of the control terminal of the driving circuit.

19. A display device comprising a pixel circuit, wherein the pixel circuit includes a light emitting element, a driving circuit, an energy storage circuit, an initialization circuit, and a compensation control circuit; wherein a display period of the pixel circuit includes a refresh frame and a retention frame; the refresh frame and the retention frame each include a set phase and a light emitting phase set successively;

the compensation control circuit is electrically connected to a compensation control terminal, a control terminal of the driving circuit, and a second terminal of the driving circuit, respectively, is configured to control to connect the control terminal of the driving circuit and the second terminal of the driving circuit under the control of a compensation control signal provided by the compensation control terminal;

the initialization circuit is respectively electrically connected to an initial control terminal and an initial voltage terminal, and the initialization circuit is electrically connected to a first terminal of the driving circuit, is configured to control provide an initial voltage provided by the initial voltage terminal to the first terminal and/or the second terminal of the driving circuit in the refresh frame and the retention frame, at least in the set phase under the control of an initial control signal provided by the initial control terminal at least in the set phase;

the second terminal of the driving circuit is electrically connected to the light emitting element, and is configured to drive the light emitting element under the control of a potential of the control terminal of the driving circuit;

wherein the initialization circuit includes a second initialization sub-circuit; the initial control terminal includes a second initial control terminal, and the initial voltage terminal includes a second initial voltage terminal;

the second initialization sub-circuit is electrically connected to the second initial control terminal, the second initial voltage terminal and the first terminal of the driving circuit, respectively, is configured to write a second initial voltage provided by the second initial voltage terminal into the first terminal of the driving circuit in the refresh frame and the retention frame, at least in the set phase under the control of a second initial control signal provided by the second initial control terminal.

20. The display device according to claim 19, wherein the initialization circuit includes a second initialization sub-circuit, the second initialization sub-circuit includes a second transistor, the compensation control circuit includes a third transistor, the pixel circuit further includes a first light emitting control circuit, a second light emitting control circuit, a data writing-in circuit and a reset circuit, the first light emitting control circuit includes a fourth transistor, the second light emitting control circuit includes a fifth transistor, the data writing-in circuit includes a sixth transistor, and the reset circuit includes a seventh transistor;

the third transistor is an n-type transistor, and the second transistor, the third transistor, the fourth transistor, the fifth transistor, the sixth transistor, the seventh transistor and a driving transistor included in the driving circuit are p-type transistors.

* * * * *